(12) United States Patent
Michelsen et al.

(10) Patent No.: US 9,727,314 B2
(45) Date of Patent: Aug. 8, 2017

(54) COMPOSITE VIRTUAL SERVICES

(71) Applicant: CA, Inc., Islandia, NY (US)

(72) Inventors: John J. Michelsen, Arlington, TX (US); Christopher C. Kraus, Dallas, TX (US)

(73) Assignee: CA, Inc., Islandia, NY (US)

( * ) Notice: Subject to any disclaimer, the term of this patent is extended or adjusted under 35 U.S.C. 154(b) by 461 days.

(21) Appl. No.: 14/222,425

(22) Filed: Mar. 21, 2014

(65) Prior Publication Data

US 2016/0259627 A1    Sep. 8, 2016

(51) Int. Cl.
G06F 9/44    (2006.01)

(52) U.S. Cl.
CPC ..................... *G06F 8/35* (2013.01)

(58) Field of Classification Search
CPC .............. G06F 8/35; G06F 2201/87
See application file for complete search history.

(56) References Cited

U.S. PATENT DOCUMENTS

| | | |
|---|---|---|
| 5,345,587 A | 9/1994 | Fehskens et al. |
| 5,450,586 A | 9/1995 | Kuzara et al. |
| 5,485,618 A | 1/1996 | Smith |
| 5,576,965 A | 11/1996 | Akasaka et al. |
| 5,581,696 A | 12/1996 | Kolawa et al. |
| 5,642,511 A | 6/1997 | Chow |
| 5,798,757 A | 8/1998 | Smith |
| 5,867,707 A | 2/1999 | Nishida et al. |
| 5,956,479 A | 9/1999 | McInerney et al. |
| 5,958,008 A | 9/1999 | Pogrebisky et al. |
| 5,999,988 A | 12/1999 | Pelegri-Llopart et al. |
| 6,002,871 A | 12/1999 | Duggan et al. |
| 6,038,395 A | 3/2000 | Chow |
| 6,061,721 A | 5/2000 | Ismael et al. |

(Continued)

FOREIGN PATENT DOCUMENTS

EP    869433    10/1998

OTHER PUBLICATIONS

Wikipedia, "Mock Object," Sep. 23, 2008, printed May 31, 2009, http://en.wikipedia.org/wiki/Mock_object, pp. 1-5.

(Continued)

*Primary Examiner* — Marina Lee
(74) *Attorney, Agent, or Firm* — Patent Capital Group

(57) ABSTRACT

Composite virtual service models can be defined to model various business transactions. A request of a particular component in a first transaction is identified and a composite virtual service model can be identified that corresponds to the particular component. The composite virtual service model models a plurality of transactions comprising the first transaction between the particular component and a first component and a second transaction between the particular component and a second component. The composite virtual service model defines a correlation between the first transaction and the second transaction. A first synthetic response is generated from the composite virtual service model based at least in part on the request, the first synthetic response simulating a response of the first component. A second synthetic response is generated from the composite virtual service model based at least in part on the correlation to simulate a response of the second component.

20 Claims, 10 Drawing Sheets

(56) References Cited

U.S. PATENT DOCUMENTS

| | | | |
|---|---|---|---|
| 6,112,238 A | 8/2000 | Boyd et al. | |
| 6,122,627 A | 9/2000 | Carey et al. | |
| 6,134,540 A | 10/2000 | Carey et al. | |
| 6,134,581 A | 10/2000 | Ismael et al. | |
| 6,144,962 A | 11/2000 | Weinberg et al. | |
| 6,189,138 B1 | 2/2001 | Fowlow et al. | |
| 6,230,309 B1 | 5/2001 | Turner et al. | |
| 6,249,882 B1 | 6/2001 | Testardi | |
| 6,292,827 B1 | 9/2001 | Raz | |
| 6,353,840 B2 | 3/2002 | Saito et al. | |
| 6,408,430 B2 | 6/2002 | Gunter et al. | |
| 6,427,230 B1 | 7/2002 | Goiffon et al. | |
| 6,442,541 B1 | 8/2002 | Clark et al. | |
| 6,463,578 B1 | 10/2002 | Johnson | |
| 6,473,707 B1 | 10/2002 | Grey | |
| 6,490,719 B1 | 12/2002 | Thomas | |
| 6,557,011 B1 | 4/2003 | Sevitsky et al. | |
| 6,558,431 B1 | 5/2003 | Lynch et al. | |
| 6,587,969 B1 | 7/2003 | Weinberg et al. | |
| 6,601,018 B1 | 7/2003 | Logan | |
| 6,601,020 B1 | 7/2003 | Myers | |
| 6,637,020 B1 | 10/2003 | Hammond | |
| 6,662,188 B1 | 12/2003 | Rasmussen et al. | |
| 6,668,371 B2 | 12/2003 | Hamilton et al. | |
| 6,684,387 B1 | 1/2004 | Acker et al. | |
| 6,785,882 B1 | 8/2004 | Goiffon et al. | |
| 6,792,426 B2 | 9/2004 | Baumeister et al. | |
| 6,810,368 B1 | 10/2004 | Pednault | |
| 6,826,716 B2 | 11/2004 | Mason | |
| 6,851,118 B1 | 2/2005 | Ismael et al. | |
| 6,879,946 B2 | 4/2005 | Rong et al. | |
| 6,883,162 B2 | 4/2005 | Jackson et al. | |
| 6,895,578 B1 | 5/2005 | Kolawa et al. | |
| 6,912,520 B2 | 6/2005 | Hankin et al. | |
| 6,920,609 B1 | 7/2005 | Manber et al. | |
| 6,941,298 B2 | 9/2005 | Chow et al. | |
| 6,957,199 B1 | 10/2005 | Fisher | |
| 7,055,137 B2 | 5/2006 | Mathews | |
| 7,065,745 B2 | 6/2006 | Chan | |
| 7,080,303 B2 | 7/2006 | Bowers | |
| 7,149,734 B2 | 12/2006 | Carlson et al. | |
| 7,174,536 B1 | 2/2007 | Kothari et al. | |
| 7,240,328 B2 | 7/2007 | Beckett et al. | |
| 7,310,777 B2 | 12/2007 | Cirne | |
| 7,340,191 B2 | 3/2008 | Yamada | |
| 7,340,481 B1 | 3/2008 | Baer et al. | |
| 7,343,587 B2 | 3/2008 | Moulden et al. | |
| 7,350,191 B1 | 3/2008 | Kompella et al. | |
| 7,376,549 B2 | 5/2008 | Horikawa | |
| 7,392,506 B2 | 6/2008 | Garcowski et al. | |
| 7,392,507 B2 | 6/2008 | Kolawa et al. | |
| 7,401,141 B2 | 7/2008 | Carusi et al. | |
| 7,437,710 B2 | 10/2008 | Bau et al. | |
| 7,487,508 B2 | 2/2009 | Fu et al. | |
| 7,512,840 B2 | 3/2009 | Martin et al. | |
| 7,539,980 B1 | 5/2009 | Bailey et al. | |
| 7,552,036 B2 | 6/2009 | Oslake et al. | |
| 7,562,255 B2 | 7/2009 | El Far et al. | |
| 7,676,538 B2 | 3/2010 | Potter et al. | |
| 7,694,181 B2 | 4/2010 | Noller et al. | |
| 7,721,265 B1 | 5/2010 | Xu et al. | |
| 7,730,030 B1 | 6/2010 | Xu | |
| 7,783,613 B2 | 8/2010 | Gupta et al. | |
| 7,784,045 B2 | 8/2010 | Bowers | |
| 7,805,496 B2 | 9/2010 | Aiber et al. | |
| 7,827,527 B1 | 11/2010 | Chiluvuri | |
| 7,873,594 B2 | 1/2011 | Harada et al. | |
| 7,913,230 B2 | 3/2011 | Vikutan | |
| 7,966,193 B2 | 6/2011 | Kryskow et al. | |
| 8,028,272 B2 | 9/2011 | Eldridge et al. | |
| 8,060,864 B1 | 11/2011 | Michelsen | |
| 8,112,262 B1* | 2/2012 | Michelsen | G06F 11/3688 703/13 |
| 8,117,591 B1 | 2/2012 | Michelsen | |
| 8,146,057 B1 | 3/2012 | Michelsen | |
| 8,346,732 B1 | 1/2013 | Nasre | |
| 8,392,884 B2 | 3/2013 | Specchio et al. | |
| 8,538,740 B2 | 9/2013 | Kumar et al. | |
| 8,543,379 B1 | 9/2013 | Michelsen | |
| 8,555,274 B1 | 10/2013 | Chawla et al. | |
| 8,589,343 B2 | 11/2013 | Solin | |
| 8,612,994 B1 | 12/2013 | Sanderson | |
| 8,626,967 B1 | 1/2014 | Naik et al. | |
| 8,826,230 B1 | 9/2014 | Michelsen | |
| 8,898,681 B1 | 11/2014 | Acheff et al. | |
| 8,935,573 B2 | 1/2015 | Horsman et al. | |
| 8,938,808 B1 | 1/2015 | Spertus et al. | |
| 9,015,668 B1 | 4/2015 | Michelsen | |
| 9,111,019 B2 | 8/2015 | Michelsen et al. | |
| 9,128,694 B1 | 9/2015 | Michelsen | |
| 9,201,767 B1 | 12/2015 | Tarlton et al. | |
| 9,323,645 B2* | 4/2016 | Michelsen | G06F 11/3688 |
| 9,378,118 B2 | 6/2016 | Michelsen | |
| 9,417,990 B2 | 8/2016 | Michelsen | |
| 9,531,609 B2* | 12/2016 | Talbot | H04L 43/08 |
| 9,563,546 B2 | 2/2017 | Michelsen | |
| 2002/0010781 A1 | 1/2002 | Tuatini | |
| 2002/0095291 A1 | 7/2002 | Sumner | |
| 2002/0143764 A1 | 10/2002 | Martin et al. | |
| 2003/0009433 A1 | 1/2003 | Murren et al. | |
| 2003/0014216 A1 | 1/2003 | Lebow | |
| 2003/0046663 A1 | 3/2003 | Rogers et al. | |
| 2003/0051194 A1 | 3/2003 | Cabezas et al. | |
| 2003/0055670 A1 | 3/2003 | Kryskow et al. | |
| 2003/0078949 A1 | 4/2003 | Scholz et al. | |
| 2003/0081003 A1 | 5/2003 | Kutay et al. | |
| 2003/0163608 A1 | 8/2003 | Tiwary et al. | |
| 2003/0217162 A1 | 11/2003 | Fu et al. | |
| 2004/0025083 A1 | 2/2004 | Nanja | |
| 2004/0039993 A1 | 2/2004 | Kougiouris et al. | |
| 2004/0068560 A1 | 4/2004 | Oulu et al. | |
| 2004/0078782 A1 | 4/2004 | Clement et al. | |
| 2004/0123272 A1 | 6/2004 | Bailey et al. | |
| 2004/0128259 A1 | 7/2004 | Blakeley et al. | |
| 2004/0162778 A1 | 8/2004 | Kramer et al. | |
| 2004/0194064 A1 | 9/2004 | Ranjan et al. | |
| 2004/0225919 A1 | 11/2004 | Reissman et al. | |
| 2004/0230674 A1 | 11/2004 | Pourheidari et al. | |
| 2004/0237066 A1 | 11/2004 | Grundy et al. | |
| 2004/0243334 A1 | 12/2004 | Wrigley et al. | |
| 2004/0243338 A1 | 12/2004 | Sabiers et al. | |
| 2005/0027648 A1 | 2/2005 | Knowles et al. | |
| 2005/0039190 A1 | 2/2005 | Rees et al. | |
| 2005/0063335 A1 | 3/2005 | Shenfield et al. | |
| 2005/0097515 A1 | 5/2005 | Ribling | |
| 2005/0198401 A1 | 9/2005 | Chron et al. | |
| 2005/0223365 A1 | 10/2005 | Smith et al. | |
| 2005/0259682 A1 | 11/2005 | Yosef et al. | |
| 2005/0289231 A1 | 12/2005 | Harada et al. | |
| 2006/0048100 A1 | 3/2006 | Levy et al. | |
| 2006/0059169 A1 | 3/2006 | Armishev | |
| 2006/0129992 A1 | 6/2006 | Oberholtzer et al. | |
| 2006/0167970 A1 | 7/2006 | Seeley | |
| 2006/0206870 A1 | 9/2006 | Moulden et al. | |
| 2006/0224375 A1 | 10/2006 | Barnett et al. | |
| 2006/0235675 A1 | 10/2006 | Oslake et al. | |
| 2006/0265475 A9 | 11/2006 | Mayberry et al. | |
| 2007/0006177 A1 | 1/2007 | Aiber et al. | |
| 2007/0033442 A1 | 2/2007 | Tillmann et al. | |
| 2007/0073682 A1 | 3/2007 | Adar et al. | |
| 2007/0089107 A1 | 4/2007 | Squires et al. | |
| 2007/0169003 A1 | 7/2007 | Branda et al. | |
| 2007/0261035 A1 | 11/2007 | Duneau | |
| 2007/0277158 A1 | 11/2007 | Li et al. | |
| 2008/0010074 A1 | 1/2008 | Brunswig et al. | |
| 2008/0031235 A1 | 2/2008 | Harris et al. | |
| 2008/0034418 A1 | 2/2008 | Venkatraman et al. | |
| 2008/0120129 A1 | 5/2008 | Seubert et al. | |
| 2008/0127093 A1 | 5/2008 | Fernandez-Ivern et al. | |
| 2008/0262797 A1* | 10/2008 | Carusi | H04L 12/2602 702/186 |
| 2009/0064149 A1 | 3/2009 | Singh et al. | |
| 2009/0094684 A1 | 4/2009 | Chinnusamy et al. | |
| 2009/0119301 A1 | 5/2009 | Cherkasova et al. | |

(56) References Cited

U.S. PATENT DOCUMENTS

| | | | |
|---|---|---|---|
| 2009/0187534 | A1 | 7/2009 | Broll et al. |
| 2009/0204669 | A1 | 8/2009 | Allan |
| 2009/0234710 | A1 | 9/2009 | Hassine et al. |
| 2009/0282403 | A1 | 11/2009 | Poole et al. |
| 2009/0298458 | A1 | 12/2009 | Bakker et al. |
| 2010/0037100 | A1 | 2/2010 | Lopian |
| 2010/0145962 | A1 | 6/2010 | Chen et al. |
| 2010/0318974 | A1 | 12/2010 | Hrastnik et al. |
| 2010/0318992 | A1 | 12/2010 | Kushwaha et al. |
| 2011/0153581 | A1 | 6/2011 | Kass |
| 2012/0054744 | A1 | 3/2012 | Singh et al. |
| 2012/0059868 | A1 | 3/2012 | Buckl et al. |
| 2012/0066681 | A1 | 3/2012 | Levy |
| 2012/0084754 | A1 | 4/2012 | Ziegler et al. |
| 2014/0108589 | A1 | 4/2014 | Dhanda |
| 2014/0214886 | A1 | 7/2014 | Annapragada et al. |
| 2014/0223418 | A1 | 8/2014 | Michelsen et al. |
| 2014/0310392 | A1* | 10/2014 | Ho ............... H04L 69/16 709/223 |
| 2015/0052521 | A1 | 2/2015 | Raghu |
| 2015/0193226 | A1 | 7/2015 | Michelsen |
| 2015/0205699 | A1 | 7/2015 | Michelsen |
| 2015/0205700 | A1 | 7/2015 | Michelsen |
| 2015/0205701 | A1 | 7/2015 | Michelsen |
| 2015/0205702 | A1 | 7/2015 | Michelsen |
| 2015/0205703 | A1* | 7/2015 | Michelsen ......... G06F 11/3688 717/135 |
| 2015/0205704 | A1 | 7/2015 | Michelsen |
| 2015/0205706 | A1 | 7/2015 | Michelsen |
| 2015/0205708 | A1 | 7/2015 | Michelsen |
| 2015/0205709 | A1 | 7/2015 | Michelsen et al. |
| 2015/0205712 | A1 | 7/2015 | Michelsen |
| 2015/0205713 | A1 | 7/2015 | Michelsen |
| 2015/0286560 | A1 | 10/2015 | Michelsen |
| 2016/0125052 | A1 | 5/2016 | Dahan et al. |
| 2016/0140023 | A1 | 5/2016 | Michelsen |
| 2016/0197803 | A1* | 7/2016 | Talbot ............... H04L 43/08 709/224 |
| 2016/0217159 | A1 | 7/2016 | Dahan et al. |
| 2016/0239409 | A1 | 8/2016 | de Oliveira Staudt et al. |

OTHER PUBLICATIONS

Lisa, 2.0 User's Guide, Interactive TKO, Feb. 27, 2003, pp. 1-130.
Lisa, 2.0 Developer's Guide, Interactive TKO, Mar. 13, 2003, pp. 1-23.
Chapter 5—Service Discovery, Bluetooth Application Developer's Guide, 2002 (pp. 167-209).
Chatterjee, S., "Messaging Patterns in Service-Oriented Architecture, Part 1," msdn.microsoft.com/en-us/library/aa480027.aspx, Apr. 2004, (pp. 1-21).
Time to live—Wikipedia, the free encyclopedia; 2015; pp. 1-3. http://en.wikipedia.org/wikiiTime_to_live>, examiner annotated document.
Andrews et al., "Tool Support for Randomized Unit Testing," available online at URL<http://delivery.acm.org/10.1145/1150000/1145741/p36-andrews.pdf>, Jul. 2006 (pp. 36-45).
Saff et al., "Automatic Test Factoring for Java," available online at URL<http://delivery.acm.org/10.1145/1110000/1101927/p114-saff.pdf>, Nov. 2002 (pp. 114-123).
Liu, Chang, "Platform-Independent and Tool-Neutral Test Descriptions for Automated Software Testing," ISCE 2000 available online at URL: <http://delivery.acm.org/10.1145/340000/337598/p713-liu.pdf>, (Pub Date 2000) (3 pages).
Oasis, "ebXML Test Framework Draft Document—Version 0.91," Dec. 2002, The Organization for the Advancement of Structured Information Standards, 92 pages.
Microsoft® Office, "FrontPage 2003 Product Guide," © 2003 Microsoft Corporation.
Robillard, M., "Representing Concerns in Source Code," available online at <http://www.cs.ubc.ca/grads/resources/thesis/May04/Martin_Robillard.pdf> Nov. 2003 (139 pages).
Sagar, "Reflection & Introspection: Objects Exposed," Java developers' Journal, May 1, 1998, (pp. 1-16).
Doucet, et al., "Introspection in System-Level Language Frameworks: Meta-Level vs. Integrated," available online at <http://delivery.acm.org/10.1145/1030000/1022756/187010382.pdf>. Mar. 2003 (pp. 1-6).
Beltrame et al., "Exploiting TLM and Object Introspection for System-Level Simulation," available online at <http://delivery.acm.org/10.1145/1140000/1131515/p100-beltranne.pdf>, Mar. 2006 (pp. 100-105).
Wright, et al., "Introspection of Java™ Virtual Machine Under Simulation," available online at <http://delivery.acm.org/10.1145/1700000/1698148/smli_tr-2006-159.pdf>. Jan. 2006 (pp. 1-26).
Web Discussion: "Is TCP protocol stateless or not?" available online at "http://stackoverflow.com/questions/19899236/is-tcp-protocol-statelessor-not" pp. 1-3 (2013).
Yang et al., "Perracotta: Mining Temporal API Rules from Imperfect Traces", ICSE'06 May 20-28, 2006, Shanghai, China (Copyright 2006) 10 pages.
U.S. Appl. No. 14/093,293.
U.S. Appl. No. 14/093,366.
U.S. Appl. No. 14/626,867.
U.S. Appl. No. 14/626,872.
U.S. Appl. No. 14/626,878.
U.S. Appl. No. 14/626,880.
U.S. Appl. No. 14/626,886.
U.S. Appl. No. 14/626,890.
U.S. Appl. No. 14/626,894.

* cited by examiner

FIG. 3

SERVICE MODEL 300

| | COMMAND | 321(1) OBSERVED ATTRIBUTE(S) | 331(1) OBSERVED CHARACTERISTIC(S) | 341(1) OBSERVED RESPONSE |
|---|---|---|---|---|
| 301(A) TRANSACTION | COMMAND 311 | OBSERVED ATTRIBUTE(S) | OBSERVED CHARACTERISTIC(S) | OBSERVED RESPONSE |
| 301(B) TRANSACTION | | ⋯ 321(2) | 331(2) | 341(2) |
| 301(n+1) TRANSACTION | COMMAND 311 | UNKNOWN ATTRIBUTE(S) | DEFAULT CHARACTERISTIC(S) | DEFAULT RESPONSE |
| | COMMAND 312 | 322(1) ⋯ 321(n+1) | 332(1) 331(n+1) | 342(1) 341(n+1) |
| 302(A) TRANSACTION | COMMAND | OBSERVED ATTRIBUTE(S) | OBSERVED CHARACTERISTIC(S) | OBSERVED RESPONSE |
| 302(B) TRANSACTION | COMMAND 312 | USER-SPECIFIED ATTRIBUTE(S) 322(2) | USER-SPECIFIED CHARACTERISTIC(S) 332(2) | USER-SPECIFIED RESPONSE 342(2) |
| 302(m+1) TRANSACTION | COMMAND | UNKNOWN ATTRIBUTE(S) | DEFAULT CHARACTERISTIC(S) | DEFAULT RESPONSE |
| | 313 | 323 : 322(m+1) | 333 332(m+1) | 343 342(m+1) |
| 303 TRANSACTION | UNKNOWN COMMAND | UNKNOWN ATTRIBUTE(S) | DEFAULT CHARACTERISTIC(S) | DEFAULT RESPONSE |

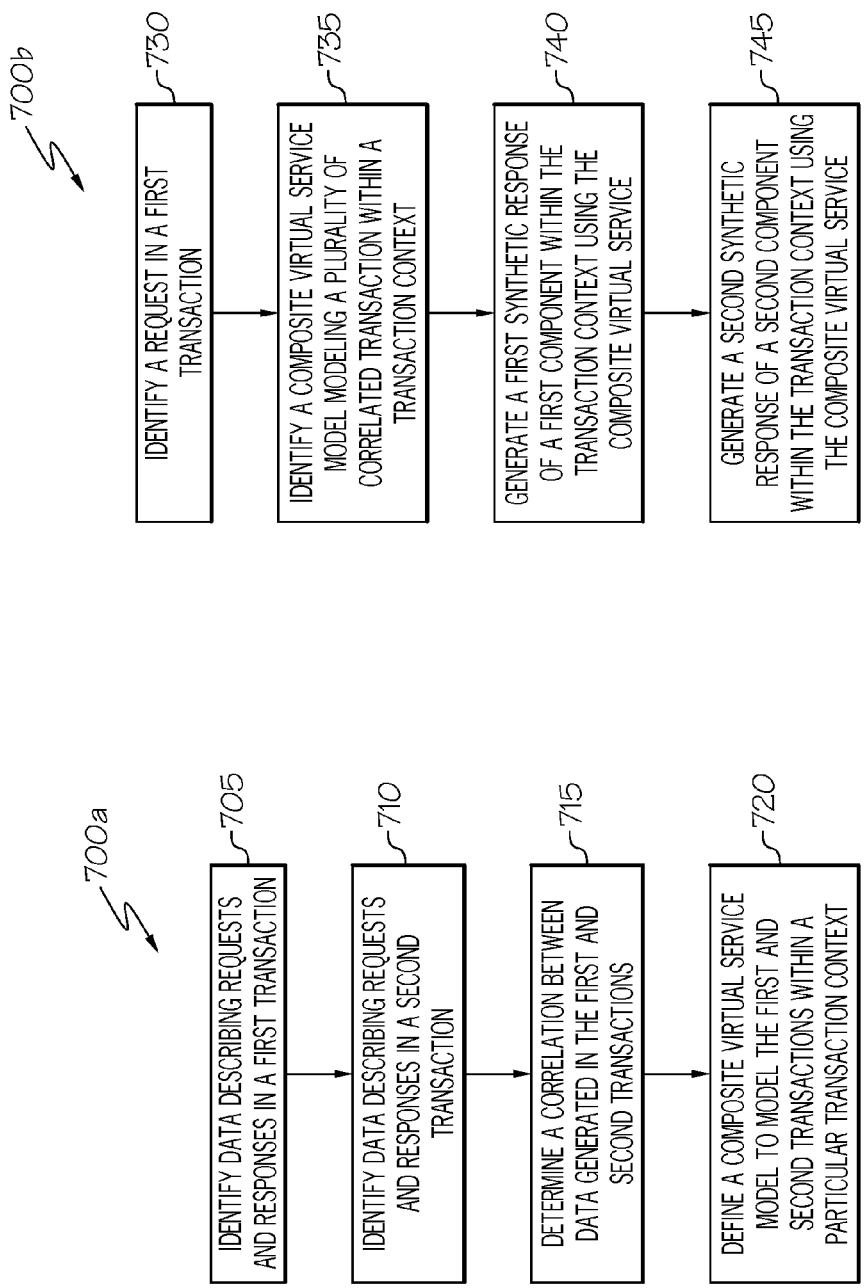

COMPOSITE VIRTUAL SERVICES

BACKGROUND

The present disclosure relates in general to the field of computer development, and more specifically, to software development involving coordination of mutually-dependent constrained systems.

Modern software systems often include multiple programs or applications working together to accomplish a task or deliver a result. For instance, a first program can provide a front end with graphical user interfaces with which a user is to interact. The first program can consume services of a second program, including resources of one or more databases, or other programs or data structures. In some cases, multiple interoperating computer programs and resources can be controlled or developed by a single entity, such as a single enterprise, publisher, or developer. In other instances, interoperating programs and resources can be developed and controlled by different parties. In some cases, access to a system component can be constrained in connection with the testing or development of the program (or its constituent components) that are to interoperate with the other components, for instance, when the component is a live production database and cannot be conveniently brought offline, is owned or controlled by a third party, or is, itself, under development.

BRIEF SUMMARY

According to one aspect of the present disclosure, a request of a particular component in a first transaction can be identified and a composite virtual service model can be identified that corresponds to the particular component. The composite virtual service model can model a plurality of transactions comprising the first transaction between the particular component and a first component and a second transaction between the particular component and a second component. The composite virtual service model can define a correlation between the first transaction and the second transaction. A first synthetic response can be generated from the composite virtual service model to simulate a response of the first component based at least in part on the request. A second synthetic response can be generated from the composite virtual service model to simulate a response of the second component based at least in part on the correlation.

Further, according to one aspect of the present disclosure, data can be identified that describes a first fragment of a business transaction involving a response of a first component to a request of a particular component. Data can also be identified that describes another fragment of the business transaction involving a response by a second component. A correlation between a value of first data generated in association with the first fragment and a value of second data generated in associated with the other fragment can be determined. A composite virtual service model can be defined to model the business transaction based at least in part on the first fragment, the other fragment, and the correlation.

BRIEF DESCRIPTION OF THE DRAWINGS

FIG. 3 is a simplified block diagram illustrating an example service model in accordance with at least one embodiment;

FIGS. 7A-7B are simplified flowcharts illustrating example techniques in connection with virtualization of a database in accordance with at least one embodiment.

Like reference numbers and designations in the various drawings indicate like elements.

DETAILED DESCRIPTION

Figure 1:
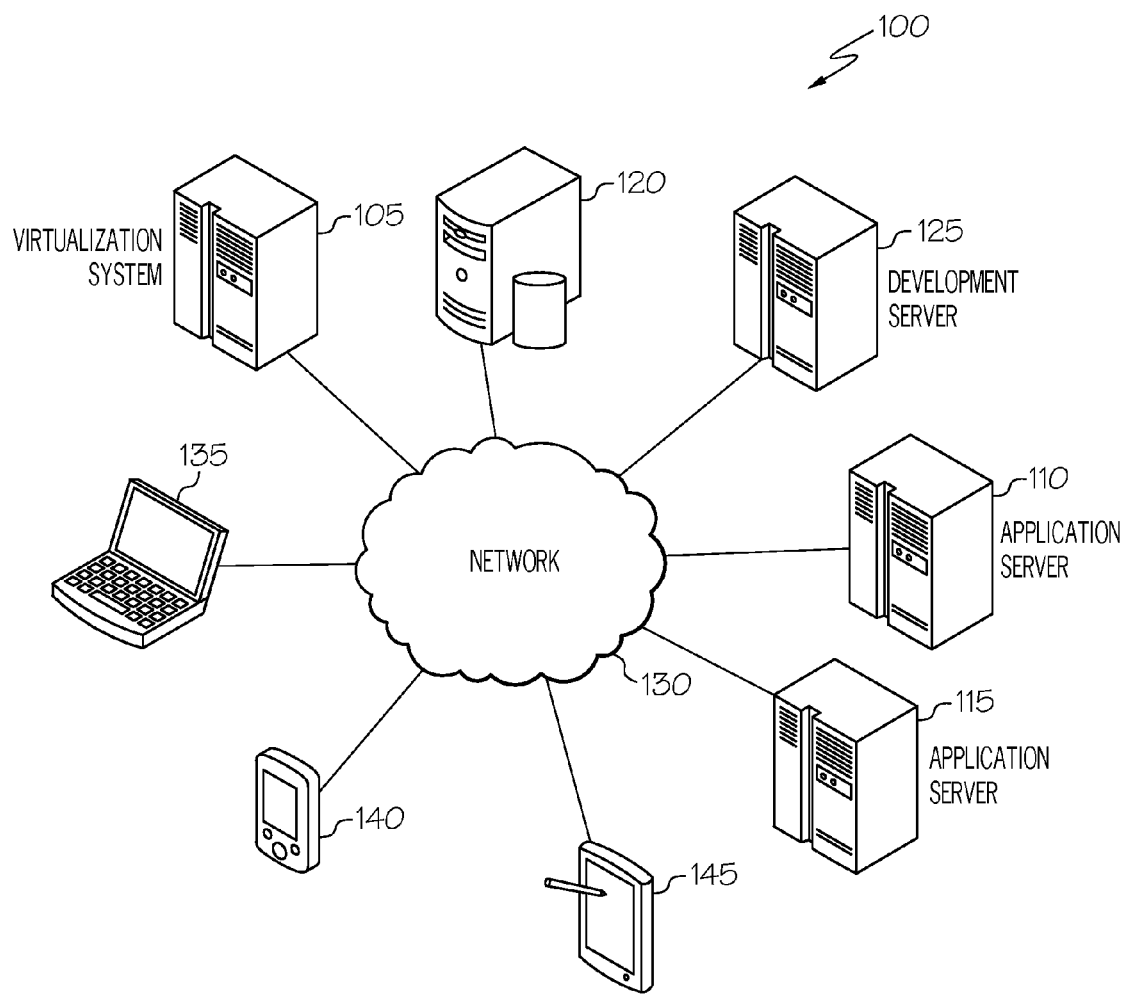
FIG. 1 is a simplified schematic diagram of an example computing system including an example virtualization system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing environment 100 including a virtualization system 105, one or more application server systems (e.g., 110, 115), one or more database systems (e.g., 120), and one or more development servers (e.g., 125), among other example systems. Virtualization system 105 can be utilized to virtualize components of resources hosted by systems 110, 115, 120, 125. In some cases, agents can be instrumented on components hosted by systems 110, 115, 120, 125. Virtual service models can be generated corresponding to interactions between the components of applications, databases, and services provided through hosted by systems 110, 115, 120, 125. A virtual service can be provided based on the virtual service model that simulates a corresponding component's responses to requests and other messages received from other components. The virtualized component synthesized using a corresponding virtual service can be used in place of the real world component, for instance, when the component or system hosting the component is offline, allows limited access (e.g., is managed or owned by a third party), under development or repair, or is otherwise unavailable, allowing software components dependent on the virtualized component to still be executed, tested, developed, etc. against the simulations provided by the virtualized component.

Virtual service models can be based on transactions between components, including transactions between applications, services, databases, and other components. The transactions can be recorded to identify patterns and behaviors relating to how one component responds to particular messages received from other components. Such transactions can include transaction fragments, with each fragment including one or more requests and one or more corresponding responses. Such requests and responses can be transmitted as messages, in some cases, sent over one or more networks (e.g., 130) between systems hosting the respective components, among other examples.

Computing environment 100 can further include one or more user computing devices 135, 140, 145 that can be used to allow users to interface with and consume resources of virtualization system 105, application servers 110, 115, database systems 120, development system 125, etc. For instance, administrator users can instrument software components, manage recording of transactions between applications and databases, administer the generation of corresponding virtual services, and perform other tasks using computing devices 135, 140, 145 in connection with the generation and use of virtual service models. In some cases such virtual services can be used in connection with the development and testing of an application, portion of an application, or other component that is dependent on one or more other components, such as a web service, mainframe system, database, etc., among other potential uses.

In general, "servers," "clients," "computing devices," "network elements," "database systems," "user devices," and "systems," etc. (e.g., 105, 110, 115, 120, 125, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux™, UNIX™, Microsoft Windows™, Apple™ OS, Apple™ iOS™, Google™ Android™, Windows Server™, etc., as well as virtual machines adapted to virtualize execution of a particular operating system, including customized and proprietary operating systems.

Further, servers, clients, network elements, systems, and computing devices (e.g., 105, 110, 115, 120, 125, 135, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a virtualization system 105, application server 110, 115, database system, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, sub-system, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Traditional systems have employed stubs in an attempt to provide a stand-in for other systems upon which another system or component is dependent. A virtual service, on the other hand, can provide more realistic simulations of such systems. Virtual services can be driven using virtual service models that model correlations between requests of a particular system and the particular system's responses to the requests. A virtual service model can, for instance, define correlations between values of data in requests and corresponding responses, define time shifting of responses to requests, define correlations across multiple services in a conversation, define response time of the service to be virtualized, state of data within the transaction (i.e., statefulness), among other example features.

In some cases, a separate virtual service model (and corresponding virtual services) can be generated for a single component. Indeed, a virtual service model can be defined for corresponding software system components on a one-to-one basis. In such implementations, virtual service models treat and model each dependent system separately and model the transactions from the perspective of the particular system being modeled. In some cases, a transaction involving a particular dependent system (or component) is, at the business level, only one in a set of multiple correlated transactions involving at least one other dependent systems. Further, the various correlated transactions and corresponding dependent systems can involve varying technologies, transport mechanisms, and other features. For example, multiple systems can be employed and multiple transactions completed in connection with an example business transaction, such as an online airfare booking. For instance, transaction segments within this particular example business transaction can involve a flight reservation, querying flight availability, credit card payment, and querying and updating frequent flyer status, among other example transaction segments. Each segment of the transaction can involve a different system. For instance, various backend systems involved in the business transaction can be written in or otherwise implemented using disparate technologies, such as Common Object Request Broker Architecture (CORBA), MQSeries, Java, SOAP, among other examples. Further, transactions implemented using such disparate technologies can involve similarly disparate transport mechanisms, such as Java Messaging Service (JMS), representational state transfer (REST), .NET, among other examples. To allow these disparate systems to be virtualized together, data used in the responses of the disparate systems can be correlated. For instance, in the particular example of an online flight booking, a common destination, reservation number, customer name, or other common data value may be stored and should correlate across a single instance of a business transaction simulated using virtualizations of the multiple disparate dependent systems, among other examples.

Separate virtual services can be defined for each dependent system in a set of dependent systems involved in a set of correlated transactions. To model correlations and state of data between the virtual services and thereby model the entirety (or at least more than one segment) of a business transaction, separate models, data structures, and resources can be developed and maintained to link the otherwise virtual services together. This can be a time consuming and expensive process. Alternatively, an improved virtual service model and virtualization system can be provided that can define a composite virtual service that models multiple correlated, dependent systems involved in one or more business transactions. A corresponding composite virtual service model can be generated based on observing the various transaction segments and dependent systems involved in a business transaction. The single composite virtual service model can be used to support multiple virtual services that simulate each dependent system involved in a business transaction. The composite virtual service can correlate data and state across multiple transports and formats used by the multiple transaction segments within the overall business transaction. Further, real systems interacting with the composite virtual service can generate responses that can be used by the real systems to cause data used by the real system to also be correlated with the correlated data of the composite virtual service synthesizing actions of multiple dependent systems. Accordingly, the composite virtual service can cause a response from one of the simulated dependent systems to be inserted into the real system to allow a transaction to proceed to a next step or segment or validate data from the virtual service. Accordingly, data correlation can be provided by the composite virtual service that spans virtual service models and real systems.

Figure 2:
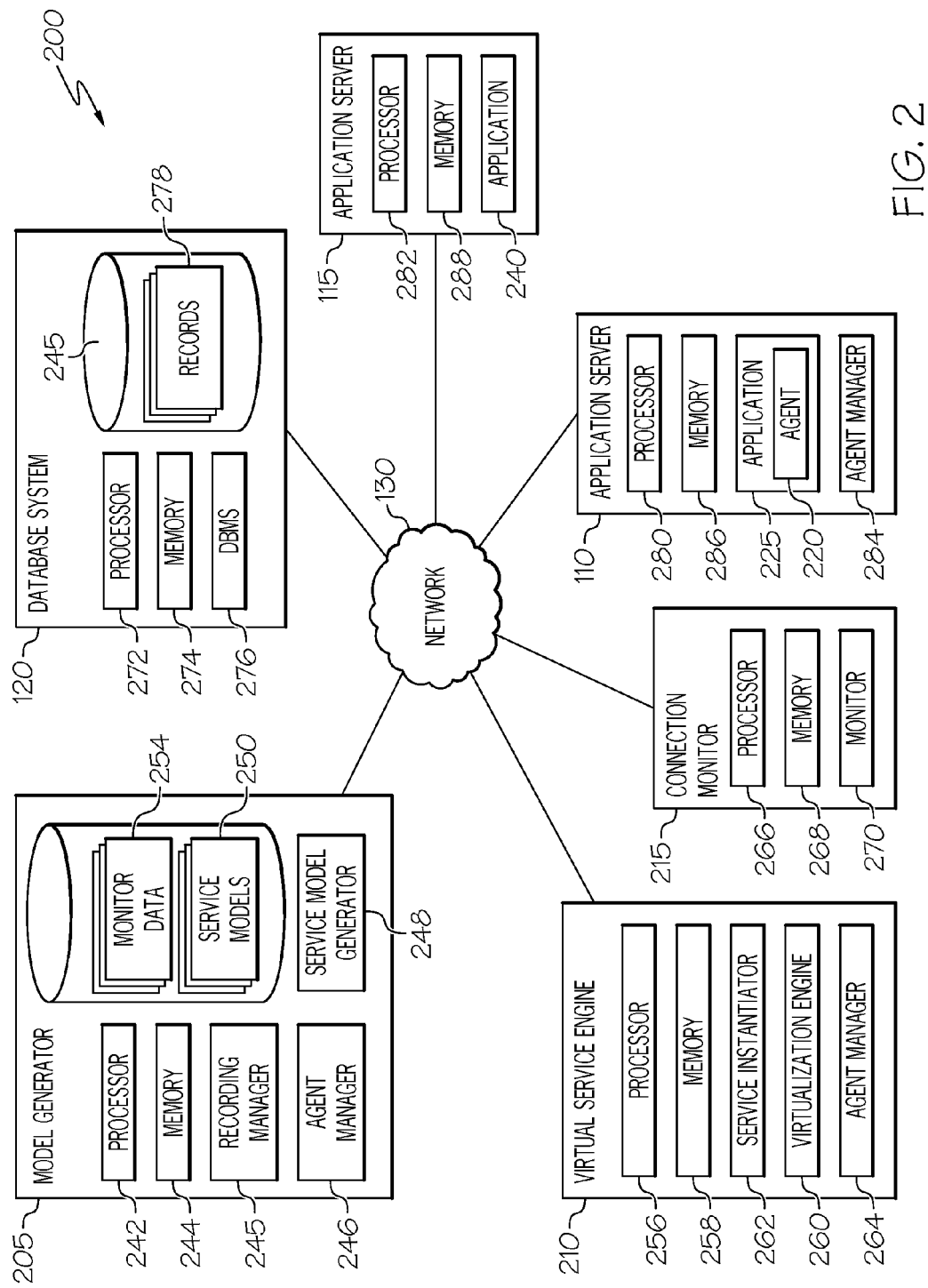
FIG. 2 is a simplified block diagram of an example computing system including an example virtual service engine and an example model generator in accordance with at least one embodiment.

At least some of the systems described in the present disclosure, such as the systems of FIGS. 1 and 2, can include functionality providing at least some of the above-described features that, in some cases, at least partially address at least some of the above-discussed issues, as well as others not explicitly described. For instance, in the example of FIG. 2, a simplified block diagram 200 is shown illustrating an example environment including a model generator 205 adapted to assist in the generation of service models (e.g., 250) that can be deployed to model transactions between one or more software components. Service models 250 generated using model generator 205 can include virtual service models (or, simply, "service models") that model a single component, as well as composite service models that model multiple components involved in a single logical transaction context, such as the context of a single business transaction, that involves multiple transaction segments. Further, a virtual service engine 210 can be provided to playback, or instantiate, a virtual service from virtual service models 250, to virtualize software component(s), including applications, databases, and other components modeled by virtual service models 250. In some cases, the virtual service engine 210 can leverage agents (e.g., 220) instrumented in applications (e.g., 225) through which requests to or synthesized responses of a virtual service can be communicated. A virtual service can also act to send data over a transport (i.e., not using an agent) to the application consuming the virtual service, as if the data were received from the virtualized software component over a network (e.g., 130), such as described, for instance, in U.S. Pat. No. 8,112,262 entitled "Service Modeling and Virtualization", incorporated herein by reference in its entirety. It should be appreciated, among other possible alternative configurations, that while FIG. 2 shows model generator 205 and virtual service engine 210 as separate subsystems (e.g., of a virtualization system), in some implementations, the functionality described in connection with model generator 205 and virtual service engine 210 can be implemented in a single system, among other examples.

In one example, a model generator 205 can be provided that includes one or more processors 242 and one more memory elements 244 along with other hardware- and software-based components, such as agent manager 246 and service model generator 230. An example agent manager 246 can include functionality for interfacing with one or more agents (e.g., 220) instrumented in virtual machines, applications, or software components, such as software components involved in transactions involving a Java-based system, database, .NET-based system, or other system or component. For example, in some implementations, agents can include functionality similar to functionality described, for instance, in U.S. patent application Ser. No. 11/328,510, titled "Instrumentation System and Method for Testing Software," filed Jan. 9, 2006, which is hereby incorporated by reference in its entirety as if completely and fully set forth herein. Agent manager 246 can manage recording of transactions using deployed agents (e.g., 220). Agents can capture data as it enters or exits the software component including data describing method calls and other requests, and corresponding responses, that are exchanged between the instrumented software component(s) and other components. Agents can be used, for instance, to capture transactions between an application and a database using, for instance, a database API (e.g., 284) used by the software component (or application, virtual machine, etc.) to interface with databases, such as described, for example in U.S. patent application Ser. No. 14/093,293, titled "Database Virtualization," filed Nov. 29, 2012, and U.S. patent application Ser. No. 14/093,366, titled "Database Virtualization," filed Nov. 29, 2012, which are each hereby incorporated by reference in their entirety as if completely and fully set forth herein. Note only can agents capture the contents of requests and responses, but agents can also capture context data, such as session data, connection data, timing data, and other information that can be used to associate various requests and responses together. Agents can inspect the internal data of a component upon which it is implemented and such internal data can also be reported as context data. Such context information can be further used to identify correlations between multiple services or components within a transaction context.

Instrumentation agents (e.g., 220), or agents, (collectively referred to herein as instrumentation agents) can be software-implemented agents that are configured to provide visibility into the operations of each instrumented component to one or more agent managers provided in connection with a virtualization system. Each instrumentation agent can be configured to detect requests and responses being sent to and from the component in which that agent is embedded. Each agent (e.g., 220) can be configured to generate information about the detected requests and/or responses and to report that information to an agent manager (e.g., 246) within, coupled to, or otherwise associated with a virtualization system. Additionally, each agent can be configured to detect and report on activity that occurs internally to the component in which the agent is embedded.

In some cases, there may be a single instrumentation agent per component, while other embodiments may be implemented differently. For example, in some systems, there can be a one-to-one correspondence between the number of instrumentation agents within a component and the number of processes (or other subcomponents) to be monitored within that component. In such embodiments, each instrumentation agent monitors and reports on its corresponding sub-component. In other instances, a single agent can monitor and have visibility into multiple components, among other examples.

A recording manager 245 can also be provided through model generator 205. An example recording manager 245 can interface with other recording components (e.g., 215) as well as itself include monitoring logic that can be used to capture requests and responses between components, in some cases, without the assistance of agents. For instance, data communicated over ports or network connections between components can be monitored and captured, for instance, by a connection monitor 215 including a processor 264, memory 268, and monitoring logic 270 implemented in software and/or hardware of the connection monitor 215. Whether captured by recording manager 245, instrumentation agents (e.g., 220), connection monitor 215, or some other recording mechanism (collectively "recording components"), monitoring data 254 can be collected that describes real-life requests and responses to the requests. Transaction fragments (describing a request and a corresponding response) can be described or determined from the monitoring data 254. Further, monitoring data 254 can describe attributes of the respective transaction fragments, including the values included in the requests and corresponding responses. Additionally, in some cases, session data and state can be included in the monitoring data 254.

Generally, in response to detecting a request, response, and/or other activity to be monitored, monitoring data 254 can further describe one or more characteristics associated with that activity and/or the monitoring of that activity by the agent, recording manager, or other component monitoring the transaction(s). The characteristics can include a frame identifier, which identifies a message in a transaction; a parent identifier, which identifies the requester that generated the request sent to the component or sub-component monitored by the agent; a transaction identifier, identifying the transaction, with respect to the component or sub-component being monitored; and an identifier that identifies the monitoring component that captured or generated the monitoring data, among other examples. Characteristics can further include other information describing the message or transaction such as a system clock value, current processor and/or memory usage, contents of the request, contents of the response to the request, identity of the requester that generated the request, identity of the responder generating the response to the request, Java virtual machine (JVM) statistics, structured query language (SQL) queries (SQLs), number of database rows returned in a response, logging information (e.g., messages logged in response to a request and/or response), error messages, session identifiers, database connection identifiers, simple object access protocol (SOAP) requests, other values generated by the monitored component that are not provided in the request or the response, web service invocations, EJB method invocations, EJB entity lifecycle events, heap sizing, and the so on. Characteristics can also include the thread name of a thread processing the request to generate the response, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, among other examples.

As the above examples indicate, characteristic information can include information generated by a monitoring component itself and information generated and/or processed by the component or sub-component monitored by the component. Monitoring data can be encapsulated, in some implementations, into frames that each describe characteristics associated with both a detected request and a detected response corresponding to that request.

Monitoring components can monitor and report characteristics independently for each transaction in which the monitored component being monitored participates. In addition to monitoring the performance of a single component and aggregating information about that component over a multitude of transactions (such that information about the performance of individual transactions can, for example, be averaged, based upon the observed performance of the component over the course of performing the multitude of transactions), monitoring components can additionally detect characteristics that are specific to and correlated with a specific transaction between a particular component and another component. More particularly, detected characteristics can be specific to and correlated with a particular request and/or response generated as part of a transaction.

Additionally, characteristics and values detected by monitoring components and also identify correlations between multiple transactions between various components that correspond to a business transaction. In some instances, a service model generator 248 or other component can include logic to identify correlations between values in a first transaction between a first pair of software components and values in a second transaction between a second pair of software component. A correlation between the transactions can be identified based on identifying a common value appearing in each of the transactions, such as an account ID, customer name, product name, among other examples. Such correlations can be identified based on such common values even when the correlated transactions make use of different transport protocols and software components. Further, a transaction flow can be determined that identifies the relationship between the correlated transactions within the overall business transaction of which the correlated transactions between software components are part.

The information provided to model generator 205 by various recording components (e.g., 215, 220, 245) can be temporarily stored (e.g., as agent data 252). Service model generator 248 can organize this information, for instance, to group information relating to common transaction fragments, transactions, and sessions (involving multiple transactions) and generate service models 250 from the monitoring data 252. Service models 250 can include models that model a single service or component as well as composite service models that model multiple services and/or components within a business transaction including multiple correlated transactions involving the multiple components.

As noted above, service model generator 248 can organize information in monitoring data 252 so that information that describes characteristics of a particular transaction or business transaction involving multiple correlated transactions is grouped with other information describing the same transaction. Thus individual frames, each of which can be received from a different instrumentation agent or other monitoring component can be organized into groups of frames that describe a complete transaction.

In some embodiments, in order to group frames, the frames can be sorted based upon timing information, or other common information (e.g., a common amount of data, port number, etc.) associated with and/or included within those frames. In addition, in the case of sorting frames by composite business transaction, common data values can be identified in responses, requests, and/or internal data detected among a set of transactions. In some cases, a correlated value may also have a matching or similar name or identifier. In other cases, the format or name of the correlated value may have no correlation, with the correlation based solely on the matched value. As an example, a business transaction can involve updating and checking-out an online shopping cart involving a first service that tracks this portion of the transaction using various data including a transaction identifier transID="0123345" and a last name associated with the account holder lname="Jones". A second portion of the business transaction can involve a credit approval transaction involving a different, second service. Completing the checkout task of the first transaction can, in some examples, be conditioned on the second transaction resulting in a positive credit approval. Further, the second transaction involving the second service can also include a value that references the particular transaction but using a different label, such as TID="012345". Similarly, in this particular illustrative example, the second transaction can identify the last name of the account holder, but as surname="Jones". These differences in labeling notwithstanding, service model generation logic can identify a recurring correlation between the values of the transID and TID fields and the lname and surname fields in monitoring data 254 identified for multiple unique instances of the first and second transactions. The service model generation logic can determine, based on these identified correlations, that the first and second transactions are parts of a composite business transaction. Other information can be used to corroborate the determination that different transactions involving different components are correlated, such as timing information indicating a temporal relationship between the transactions, recurring patterns in conversations or flow between the components participating in the first and second transactions, among other examples.

In some cases, agents and other monitoring components can be provided with functionality for tagging data of a request or response monitored by the agent before it exits or enters the component it monitors, the tag identifying a particular session or transaction to which the request or response and corresponding characteristic information belongs. After being sorted, the frames can be arranged in ascending or descending order, for instance, using timing information, inserted tag data, or other information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing or other flow information. Additionally, a flow can be identified by identifying the requester/responder, parent/child relationships of each portion of the business transaction, among other information.

Within a group of frames associated with the same transaction or session, service model generator 248 can order the frames, such that the flow of the transaction can be followed from the start of the transaction to the end of the transaction. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated, in some cases, by the agents. In one embodiment, the frame identifiers can be generated from information identifying the IP address (or other addressing information), port number, session identifier, or other information used by the monitored component or sub-component, the amount of data sent or received by the monitored component during the monitored activity, and/or the instrumentation agent itself.

A virtual service generation engine 210 can use the identified set of expected requests and responses defined in service models 250 to provide one or more virtual services simulating operation of a modeled component, such as database 252. Service models can further support stateful virtualization and imitate a series of particular requests in a session, such as a session driven by a human user of the client application providing the simulated inputs to database 252, among other examples. In one example, virtual service generation engine 210 can include one or more processors 256 and one more memory elements 244 along with other hardware- and software-based components, such as service instantiator 262, virtualization engine 260, and agent manager 264, among potentially other examples. Service instantiator 262 can be provided to instantiate virtual services from service models 250. For example, it can be identified that a dependency of an application (e.g., 225), such as a database, is unavailable. A virtual service model 250 corresponding to the dependency can be identified and a corresponding virtual service simulating the dependency can be initiated. Virtualization engine 260 can provide the instantiated virtual service to another service that is dependent on or otherwise consuming the virtualized service(s). For example, in some cases, virtualization engine can provision a virtual service, such as described in U.S. Pat. No. 8,112,262, in a virtual machine with which a software component can interact with directly in lieu of the modeled dependency. In other instances, virtualization engine 260 can utilize agents (e.g., 220) to provide the responses of a virtualized dependency. For example, virtualization engine 260 can communicate with agents provisioned on the consuming system to intercept particular requests from the consuming component and generate synthetic responses consistent with a transaction defined in a corresponding service model 250 that mimics the response that would be received from a live version of the dependency. In other words, synthetic responses are generated by virtual services standing-in for real-world services or components, and the synthetic responses are to simulate responses that these real-world services would generate in response to a given request. The responses are "synthetic" in the sense that they are not the actual responses of the real-world component, but are instead the simulated responses of a virtual service based on observations of how the real-world components would generally behave in response to various requests.

In the case of composite virtual services, virtual service engine 210 can utilize a composite virtual service model that considers the correlations between multiple services and transactions, their data, state, and timing to synthesize the results and responses of multiple, distinct components involved in the business transaction, including distinct components implemented on distinct machines and/or using different technologies (e.g., Java, SOAP, CICS mainframe, etc.).

As noted, service models (e.g., 250) generated by a model generator 205 can be based on requests and responses between two or more software components or systems (such as an application (e.g., 225) and database 252). A virtualization engine 260 can detect a request of a component that is to be virtualized and identify each transaction, defined in a service model (e.g., 250) corresponding to the virtualized component, that corresponds to a request of that type and similar attributes. The service model can further describe characteristics of the transactions. Such information can include timing information identifying time thresholds or limits at which particular requests and/or responses are detected or sent (e.g., in order to identify the delay between when the request was detected and/or sent and when the associated response was detected and/or sent), and the like. Virtual services instantiated from such service models can embody these performance characteristics captured or defined in the service model, including response times, network bandwidth characteristics, processor usage, etc.

In one example, a virtualization engine 260 can be configured to identify and describe requests and responses in each of a variety of different protocols as well as the pertinent information from each. Thus, service models can include configuration information identifying the basic structure of requests and responses for each of several supported communication protocols. Depending upon the protocol in use, for instance, requests can take the form of method calls to an object, queue and topic-type messages (e.g., such as those used in Java messaging service (JMS)), requests to access one or more web pages or web services, database queries (e.g., to a structured query language (SQL) or Java database connectivity (JDBC) application programming interface (API)), packets or other communications being sent to a network socket, and the like. Similarly, responses can include values generated by invoking a method of an object, responsive messages, web pages, data, state values (e.g., true or false), and the like.

Service models 250 can be used as the basis of virtual services modeling the software components providing the requests and/or responses modeled in the service models 250. Virtual services can capture and simulate the behavior, data and performance characteristics of complete composite application environments, making them available for development and testing at the request of a user or system and throughout the software lifecycle, among other advantages.

In some cases, virtual services can be instantiated from a service model modeling a single component to virtualize a single, particular component in the composite environment. In other cases, a composite virtual service can be instantiated from a composite service model modeling multiple correlated components within the composite application environment. Virtual services, generally, can provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment implemented, for instance, within on-premise computing environments, agents, in private and public cloud-based lab, using virtual machines, traditional operating systems, and other environments, among other examples.

As noted above, in some implementations, when a service model is used to instantiate a virtual service, the virtualization process can involve comparing new requests generated by a requester (e.g., a client application under development) to the request information stored in a corresponding service model. For example, if a new request containing a particular command and attributes is received, the service model can be searched for a matching request that contains the same command and attribute. If a matching request is found, the virtualization process returns the response (as identified by information stored in service model) associated with the matching request to the requester.

In many situations, the requests provided to a virtual service will not be exactly the same (i.e., containing the same request as well as the same attribute(s)) as the requests identified in service model. For example, a request provided to the corresponding virtual service may contain the same request but a different attribute or set of attributes. A service model can further include information usable to handle these requests. For instance, transactions containing requests that specify the same command can be identified as being of the same transaction type. Alternatively, a set of transactions can be identified as being of the same type if all of those transactions have requests that include the same command as well as the same number and type of attributes. The particular technique used to identify whether two or more transactions are of the same type can be protocol specific, in some embodiments (e.g., classification of transactions can be at least partially dependent upon the particular communication protocol being used between the requester and the server).

For each unique type of transaction included in a service model, some implementations of a service model can further provide information or instructions for use by a virtual service in generating responses to requests with unknown attributes (e.g., an unknown attribute that was not observed as part of the monitored traffic or even specified by a user during a manual service model building process). Further, service models can also include information describing how to respond to an unknown request (e.g., a request that contains a command that was not observed as part of the monitored traffic). As an example, the request portion of this service model information can indicate (e.g., through the use of a wildcard command identifier) that all unknown types of requests that are not otherwise identified in service model should match this request. The response portion of the generated information can include an appropriate response, among other examples.

In addition to adding information describing unknown transactions of known and unknown types, some implementations of service models can support time sensitive responses. In such embodiments, response information in the server model can facilitate substitution of time sensitive attributes for actual observed attributes. For instance, an actual attribute "10:59 PM Oct. 1, 2009" can be replaced with a time sensitive value such as "[SYSTEM CLOCK+11 HOURS]". When the service model is used to generate responses by the virtual service, the time sensitive value can be used to calculate the appropriate attribute to include in each response (e.g., based on the current system clock value). To illustrate, in this particular example, if the service model is being used by a virtual service and the response attribute includes the time sensitive value [SYSTEM CLOCK+11 HOURS], the response generated based upon the service model will include the value generated by adding 11 hours to the system clock value at the time the request was received. In general, time sensitive values specify an observable time, such as a time value included in a request or the current system clock time, and a delta, such as an amount of time to add or subtract from the specified observable time. Time sensitive values can be included in the response information for all types (known and unknown) of transactions.

In some implementations, a service model can further include information facilitating the use of request sensitive values to be included in responses generated by the virtual service using the service model. A request sensitive value can link an attribute included in the request to a value to be included in the response. For example, response information in a service model can indicate that a particular request attribute be used as the basis of a particular attribute of the response to be returned in response to the request.

When the model is used, the response generated by the virtualized service will include the value indicated by the request sensitive value. For example, the model can include three known transactions of a given transaction type, as well as one unknown transaction of that type. The information describing the unknown transaction can indicate that the single response attribute is a request sensitive attribute that should be the same as the first attribute of the request. A request of that type that contains an unknown first attribute (i.e., an attribute that does not match the attribute(s) stored for the three known transactions of that type in the model) can be sent to the virtualized service. In response to receiving this request and accessing the request sensitive value specified in the response information for the unknown transaction, the virtualized service returns a response that includes the value of the first attribute that was contained in the received response. As an example, if the information describing a known transaction of type A indicates that the request includes the string "UserID" as the first request attribute and that the corresponding response includes the string "UserID" as its second response attribute, a request sensitive value specifying "[REQUEST ATT 1]" (first request attribute) can be generated for the second response attribute in the service model, among many other potential examples, including more complex examples with more complex dependencies defined in the service model between certain request attribute and request sensitive response attributes.

In the case of composite virtual services, a request sensitive value may be one of the values that is correlated across multiple component transactions within a composite transaction. For instance, the value of "UserID" may be included in responses generated by the modeled software components or may be otherwise maintained or used by multiple software components in the corresponding composite transaction context. In other cases, values may not be request sensitive or dependent and "dummy" data can be generated by the virtual service logic for the values that are correlated across multiple component transactions modeled by the composite service model. In either case, when a value is assigned by the virtual service in the virtualization of one of the components modeled by a composite service model, the same or similar value, if correlated across multiple components, may be propagated throughout the virtualization of the remaining portions (i.e., components and transactions) of the composite transaction, such that state of data across the multiple transactions is automatically and realistically maintained.

A service model can include still additional information. For example, a service model can identify characteristics of each transaction in order to identify availability windows for a corresponding software component modeled by the service model, load patterns for the software component, and the like. For example, if an access window is identified for a particular type of transaction, a corresponding service model can be generated to include a characteristic indicating that a response (or a particular type of response) will only be generated if the request is received during the identified access window, among many other potential examples. In the case of a composite virtual service, interrelationships and interdependencies between timing, resource access windows, etc. by the multiple transactions and components within a composite transaction can be modeled and virtualized in a composite virtual service.

Turning to FIG. 3, a simplified block diagram is shown representing an example view of an example service model 300. For instance, FIG. 3 shows information that can be maintained as part of a service model. In this particular example, service model 300 can include a row for each of several transactions. Each row of service model 300 can identify a command, zero or more attributes, zero or more characteristics, and one or more response attributes. This service model can be stored in a spreadsheet, table, database, or any other data structure.

In this example, transaction 301(A) is a transaction corresponding to a scenario defined in an interaction contract defined between two or more developers. In other instances, transaction 301(A) can be a transaction that was an observed transaction that actually occurred between a requester and a server component being modeled, as detected, for instance, by an agent or other tool. The information describing transaction 301(A) can include request information, which includes command 311 and zero or more defined attributes 321(1). The information describing transaction 301(A) can also include response information 341(1) describing the expected response that corresponds to the request. This response information 341(1) can also include one or more attributes. Characteristics 331(1) can include zero of more characteristics of transaction 301(A) defined based on scenarios of the interaction contract. These characteristics can include timing information describing a threshold delay of a response to a request or the like, as described above.

Transaction 301(B) can be of the same transaction type as transaction 301(A), since both transactions included a request that contained command 311. Transaction 301(B) is described by attributes 321(2) (which can have values that differ from those attributes defined in the request of transaction 301(A)), characteristics 331(2) (which can again differ from those for transaction 301(A)), and response 341(2) (which can also have a value that differs from the response defined for transaction 301(A)).

In this example, information describing n (an integer number) known transactions of the same type as transactions 301(A) and 301(B) is stored in service model 300. These known transactions are transactions that were either generated from scenario data or manually specified by a user. As part of the model building process, information describing an n+1th transaction of the same type has been added to service model 300 by the service model generator. This n+1th transaction, labeled transaction 301(*n*+1), can describe an "unknown" transaction of a known type of transaction. Such an unknown transactions is of a known type because it has the same command, command 311, as the other transactions of this type. However, unlike the other known transactions of this type, unknown transaction 301(*n*+1) can be used to respond to requests containing command 311 and "unknown" attributes that do not match those known attributes stored for transactions 301(A)-201(*n*) (not shown). The information describing transaction 301(*n*+1) thus includes information (e.g., wildcard information) identifying unknown attributes 321(*n*+1), such that any request that includes command 311 and an attribute that does not match the defined attributes stored for the actual transactions (e.g., such as transactions 301(A) and 301(B)) will match the request information for transaction 301(*n*+1). The information describing transaction 321(*n*+1) can also include default characteristics 331(*n*+1) and default response 341(*n*+1). These default values can be copied from the corresponding fields of an actual response of the same type.

Information describing another set of transactions of a different type can also be stored within the service model 300 for a particular software component. As shown, m+1 transactions, including transaction 302(A), 302(B), and 302(*m*+1) of a type of transaction in which the request includes command 312 can be stored in service model 300. Like transactions 301(A) and 301(B), transaction 302(A) can be another transaction corresponding to a scenario and involving the particular software component. Further, the information describing this transaction can also include the corresponding command 312, attributes 322(1) (if any), defined characteristics 332(1) (if any), and corresponding response 342(1).

In some instances, a model generator can automatically generate a set of requests and responses, together with corresponding attributes and characteristics of the requests and responses based on computer-parsable scenario data provided to the model generator. In some implementations, a user can supplement the transaction defined by the model generator with one or more user-specified transactions, for instance, in the event of a change or exception to the interaction contract or to capture a nuance not adequately detected and captured by the model generator, among other examples. For instance, a user can enter the information describing such a transaction via a user interface. The information describing transaction 302(B) can include command 312, zero or more user-specified attributes 322(2), zero or more user-specified characteristics 332(2), and a user-specified response 342(2). In some embodiments, the user is prompted for entirely new information for each of these user-specified fields. In other embodiments, the user can be allowed to select an existing field (e.g., of another user-specified transaction or of an automatically-detected transaction) to copy into one or more of these fields. It is noted that a user can also create a user-specified transaction by modifying information describing an actual transaction. As FIG. 3 shows, user-supplied transaction information can be stored in the same model as transaction information generated from parsing of scenario data of an interaction contract. In other instances, service models can be generated that are dedicated to user-supplied transaction information while others are dedicated to transaction information generated from scenario data by a model generator, among other examples.

In some instances, a service model 300 can also include information describing an unknown transaction 302(m+1). The information describing transaction 302(m+1) was added to service model 300 after m (an integer number, which does not necessarily have the same value as n) known transactions were described by the model. The information describing this unknown transaction 302(m+1) can be used to handle requests of the same type (e.g., containing command 312) that specify unknown attributes. Accordingly, the information describing transaction 302(m+1) can include command 312, unknown attributes 322(m+1) (i.e., attribute information that will match any attributes not identified in the known attributes stored for the other m transactions of this type), default characteristics 332(m+1), and default response 342(m+1). Further, transactions of an unknown transaction of unknown type (e.g., 303) can also be defined in a service model 300. For instance, the information describing transaction 303 can be used to respond to any request of a type not already described by another row of service model 300. Accordingly, a request containing a command other than commands 311 and 312 could be responded to using the information describing transaction 303, among other examples. As shown, the information describing transaction 303 includes unknown command information 313, which is configured to match any command not already specified in service model 300, unknown attribute information 323, which is configured to match all attributes (if any) associated with unknown commands, default characteristics 333, and a default response 343. As with the default characteristics and responses associated with unknown transactions of known type, transaction 303's default characteristics and response can be user-specified.

Figure 4:
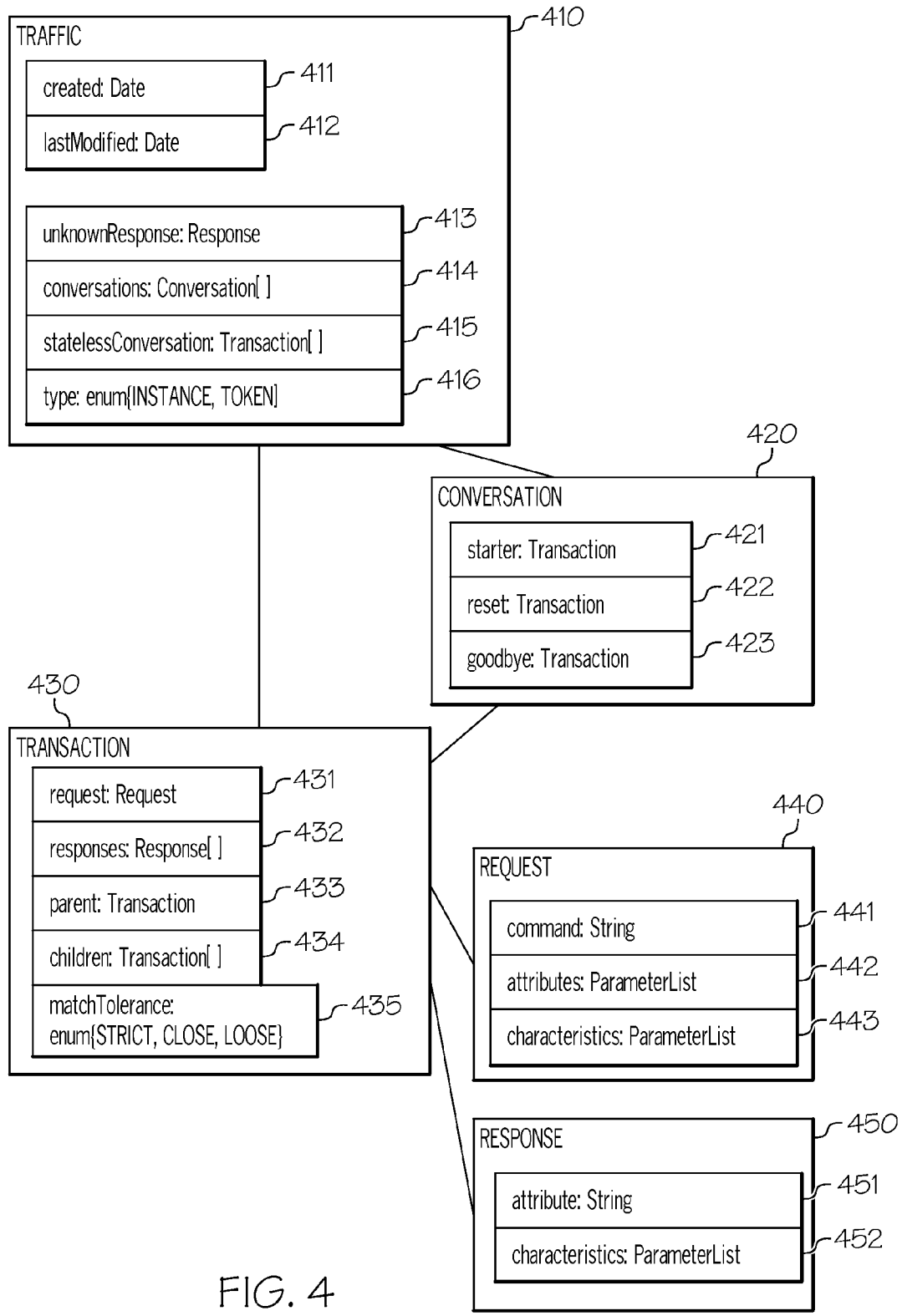
FIG. 4 is a simplified block diagram illustrating aspect of another example service model in accordance with at least one embodiment.

Turning to FIG. 4, a simplified block diagram is shown illustrating representing example features of an example service model for use in virtual services supporting stateful and stateless transactions. Statefulness of a transaction can be identified from parsing of scenario data to generate a service model supporting the modeling of such stateful transactions. In the example of FIG. 4, a data model is shown that includes five data patterns: traffic pattern 410, conversation pattern 420, transaction pattern 430, request pattern 440, and response pattern 450. Traffic pattern 410 can be used to store information identifying a particular software application to be developed in accordance with an interaction contract and the transactions of such an application. Each service model can include a single instance of traffic pattern 410. As shown, traffic pattern 410 includes created field 411, which stores date information identifying when the service model of that particular application was initially created. Traffic pattern 410 also includes lastModified field 412, which stores date information identifying the most recent time at which any of the information in the service model of the particular service was modified.

Traffic pattern 410 can also include an unknownResponse field 413. UnknownResponse field 413 can store information identifying the particular instance of the response pattern that stores information identifying the response to use for unknown transactions of unknown types. Accordingly, in embodiments employing the data pattern of FIG. 4, if an unknown transaction of unknown type is detected by a request processing module, the request processing module will use the response pattern instance identified in unknownResponse field 413 to generate a response.

Traffic pattern 410 includes conversations field 414. Conversations field 414 can identify one or more instances of conversation pattern 420. Conversation pattern 420 stores information representing a set of two or more stateful transactions. Such a set of stateful transactions is referred to herein as a conversation. The instance(s) of conversation pattern 420 identified in conversations field 414 identify all of the conversations for the application to be modeled. If the particular service does not include any stateful transactions (e.g., if no stateful transactions are identified from scenarios defined for an interaction contract), conversations field 414 will not identify any instances of conversation pattern 420.

Traffic pattern 410 can additionally include statelessConversation field 415. This field can identify one or more instances of transaction pattern 430. Transaction pattern 430 stores information representing a transaction. Each instance of transaction pattern 430 identified in statelessConversation field 415 stores information identifying a stateless transaction. StatelessConversation field 415 can identify instances of transaction pattern 430 associated with both known and unknown transactions of known types. If the particular service being modeled does not include any stateless transactions, statelessConversation field 415 will not identify any instances of transaction pattern 430. Type field 416 can store one of two values: INSTANCE or TOKEN that identifies the type of stateful transactions, if any, provided by the service being modeled.

As noted above, conversation pattern 420 can store information identifying a set of stateful transactions. A given service model can include n instances of conversation pattern 420, where n is an integer that is greater than or equal to zero. Conversation pattern 420 can include a starter field 421. This field stores information identifying an instance of transaction pattern 430 associated with a starter transaction. The starter transaction is a transaction that acts as the first transaction in a stateful series of transactions (e.g., a login transaction). In at least some embodiments, all starter transactions can be unknown transactions of known type, as will be described in more detail below. The particular transaction type to use as a starter transaction can be specified by the model generator or a user during the service model configuration process.

Conversation pattern 420 also includes reset field 422. Reset field 422 stores information identifying one or more instances of transaction pattern 430, each of which is associated with a reset transaction (such a reset transaction can be a known or unknown transaction). The value of reset field 422 can be provided by a user (e.g., the user can be prompted to identify the reset transaction(s) for each conversation). A reset transaction is a transaction that, if detected, causes the flow of the conversation to return to the point just after performance of the starter transaction. Conversation pattern 420 also includes a goodbye field 423. This field stores information identifying an instance of transaction pattern 430 associated with one or more goodbye transactions (of known or unknown type) for the conversation. A goodbye transaction is a transaction that causes the conversation to end. To reenter the conversation after a goodbye transaction is performed, the starter transaction for that conversation would need to be re-performed.

Transaction pattern 430 stores information identifying a transaction. Transaction pattern 430 includes request field 431, responses field 432, parent field 433, children field 434, and matchTolerance field 435. Transaction pattern 430 can be used to store stateful and stateless transactions (in some instances, the same transaction can occur both within a conversation and in a stateless situation where no conversation is currently ongoing). Transactions that are always stateless will not include values of parent field 433, children field 434, or matchTolerance field 435.

Request field 431 identifies the instance of request pattern 440 that stores information identifying the request (e.g., by command and attributes) portion of the transaction. Similarly, responses field 432 identifies one or more instances of response pattern 450 that store information identifying the response(s) that are part of that transaction. Each instance of response pattern 450 stores one response attribute (e.g., like those shown in FIG. 2), and thus if responses field 432 identifies multiple response patterns, it indicates that each of the identified response patterns should be used to generate a response when the corresponding request is received.

Parent field 433 stores a value identifying the instance of transaction pattern 430 associated with the transaction that occurs immediately before the current transaction in a conversation. Thus, if transaction pattern 430 stores information identifying the second transaction in a conversation (where the starter transaction is the first transaction in the conversation), parent field 433 can identify the instance of transaction pattern 430 associated with the starter transaction. Similarly, children field 434 can store information identifying each instance of transaction pattern 430 associated with a child transaction of the current transaction. Thus, if transaction pattern 430 stores information identifying the second transaction in a conversation, children field 434 can store information identifying the instance of transaction pattern 430 that stores the third transaction in the conversation. It is noted that children field 434 can identify more than one transaction.

MatchTolerance field 435 can store one of three values: STRICT, CLOSE, or LOOSE. The stored value indicates the match tolerance for a request received immediately subsequent to the current transaction. Strict tolerance indicates, for instance, that, if a conversation is ongoing, the request received immediately after the current transaction is only allowed to match transactions identified in the current transaction's children field 434. If instead close tolerance is specified, the request received immediately after the current transaction can match any of the current transaction's children, as well as any of the current transaction's sibling transactions. Further, if loose tolerance is specified, even more transactions are candidates for matching the next received request, and so on.

Request pattern 440 can include a command field 441, attributes field 442, and characteristics field 443. Each instance of request pattern 440 stores information identifying a particular request. A service model generator can allocate an instance of request pattern 440 for each transaction of known or unknown type. Command field 441 can store a string that identifies the command contained in the request. Attributes field 442 can store a parameter list that includes zero or more parameters, each of which represents an attribute of the request. Characteristics field 443 can store a parameter list identifying zero or more characteristics associated with the request. Each parameter in the list can identify a different characteristic. Examples of characteristics can include the time at which the request was sent, the system clock time at which the request was received by the service being modeled, network and/or system conditions that were present when the request was received, and the like. The parameters stored in characteristics field 443 can be used to generate time sensitive values, as well as to model actual conditions such as response timing and availability window, among other examples.

Response pattern 450 can include an attribute field 451 and a characteristics field 452. Attribute field 451 stores a string that represents a response attribute. As noted above, a given transaction can have multiple response attributes (e.g., responses field 432 of transaction pattern 430 can identify multiple instances of response pattern 450), and thus generating a response can involve accessing multiple response patterns in order to include the string identified in each of the response patterns' attribute field 451 in the response. Attribute field 451 can store one or more response attributes, as well as values, like request sensitive values and time sensitive values, generated by the service model generator. Characteristics field 452 can store a parameter list containing zero or more parameters. Each parameter can identify a characteristic of the response, such as the system clock time when the response was sent to the requester by the service, network and/or system conditions that were present when the response is to be sent, and the like.

While the simplified representation of FIG. 4 models a conversation between two components in a transaction, similar principles can be applied to model statefulness between transactions within a composite transaction. Indeed, a composite service model can model statefulness maintained across two or more transactions involving one or components in the composite transaction. Further, it should be appreciated that any of the features and principles described in connection with service models discussed in the examples of FIGS. 2-4 can apply as much to composite service models as they do to service models modeling a single component.

Returning briefly to the discussion of FIG. 2, an example computing environment can further include other systems. For instance, application servers 110, 115 can be provided that each host one or more applications (e.g., 225, 240). An application server (e.g., 110, 115) can include one or more processors (e.g., 280, 282) and one more memory elements (e.g., 286, 288). In some instances, software components of applications (e.g., 235, 240) hosted by application servers 110, 115 can access one or more databases (e.g., 252) using one or more database APIs or drivers (e.g., 284). Databases (e.g., 252) can be hosted by external database systems (e.g., 120) with which applications interact over one or more networks (e.g., 130). Each database can host data comprising a plurality of records (e.g., 278). Database systems (e.g., 130) can include one or more processors (e.g., 272) and one more memory elements (e.g., 274) along with a database management system (DBMS) (e.g., 276), such as a DBMS configured to interface with and manage connections with potentially multiple applications including applications using one or more database APIs (e.g., 284) to access the database (e.g., 252), among other examples.

Figure 5A:
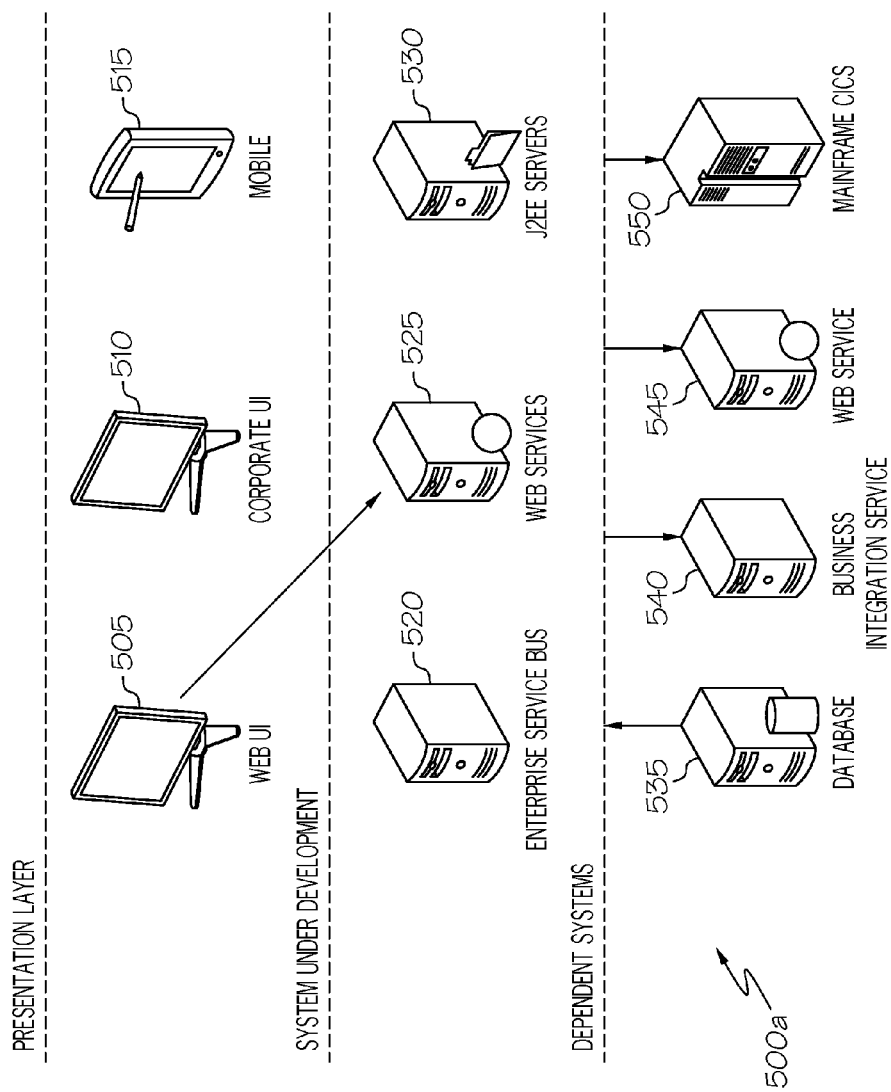
FIGS. 5A-5C are simplified block diagrams representing aspects of an example composite transaction context in accordance with at least one embodiment.

Turning to FIG. 5A, a simplified block diagram 500a illustrates various aspects of a composite transaction. For instance, in this example, multiple correlated transactions can be incorporated within a logical composite transaction (or business transaction) context. In the example of FIG. 5A, a composite transaction context can include components in a presentation layer, system under development layer, and dependent systems layer. The presentation layer can represent the various presentation technologies that might be employed, for instance, by users, to consume the end results of the composite transaction. For example, presentation layer can include web-based user interfaces 505, corporate/enterprise user interfaces 510, mobile user interface versioning 515, etc. A system including components or subsystems 520, 525, 530 may be under development that is to be consumed by various presentation layer technologies (e.g., 505, 510, 515) and is dependent on one more other systems 535, 540, 545, 550. Some of the dependent systems may be third-party and/or production systems and access to these systems 535, 540, 545, 550 may be limited or restricted. Further, dependent systems may be implemented using a variety of different technologies. For instance, dependent systems may include a database system 535, a business integration system 540, a web service system 545, CICS mainframe system 550, among other examples.

Figure 5B:
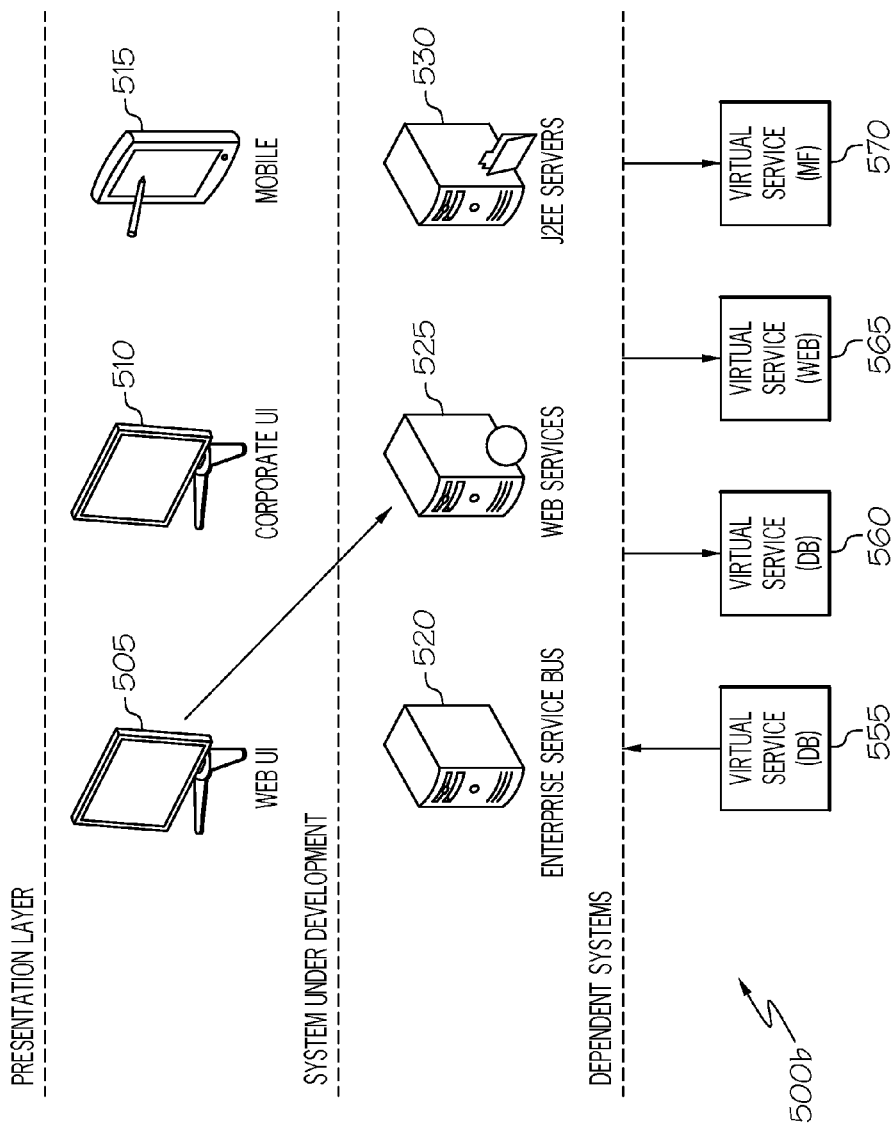

Turning to FIG. 5B, in some instances, requests and responses may be monitored between components of the system under development and components of each dependent system. Further, one or more service models may be generated from the captured requests and responses and corresponding information obtained during the monitoring. Each service model can be used to virtualize each of the distinct transactions between the system under development and the respective dependent system using virtual services 555, 560, 565, 570 corresponding to each of the dependent systems. Further, each virtual services 555, 560, 565, 570 can model the respective technology of the service or component it synthesizes. In cases where any one of the dependent systems is unavailable (and where others of the dependent systems are available) corresponding virtual services can be instantiated on a piecemeal basis. For instance, if web service 545 is the only dependent system that is not available for a testing or development exercise using the system under development (520, 525, 530), the composite system can be tested with only virtual service 565 serving as a stand-in for the real world component. However, in cases where two or more dependent services are to be virtualized, and operation of the dependent systems are between themselves at least partially interdependent, virtualization of the two or more systems can be more complicated. In some cases, additional logic and shared data structures may have to be provided to facilitate data statefulness between the otherwise independent virtual services 555, 560, 565, 570 such that data generated and maintained between the virtual services is consistent within a common business transaction context.

Figure 5C:
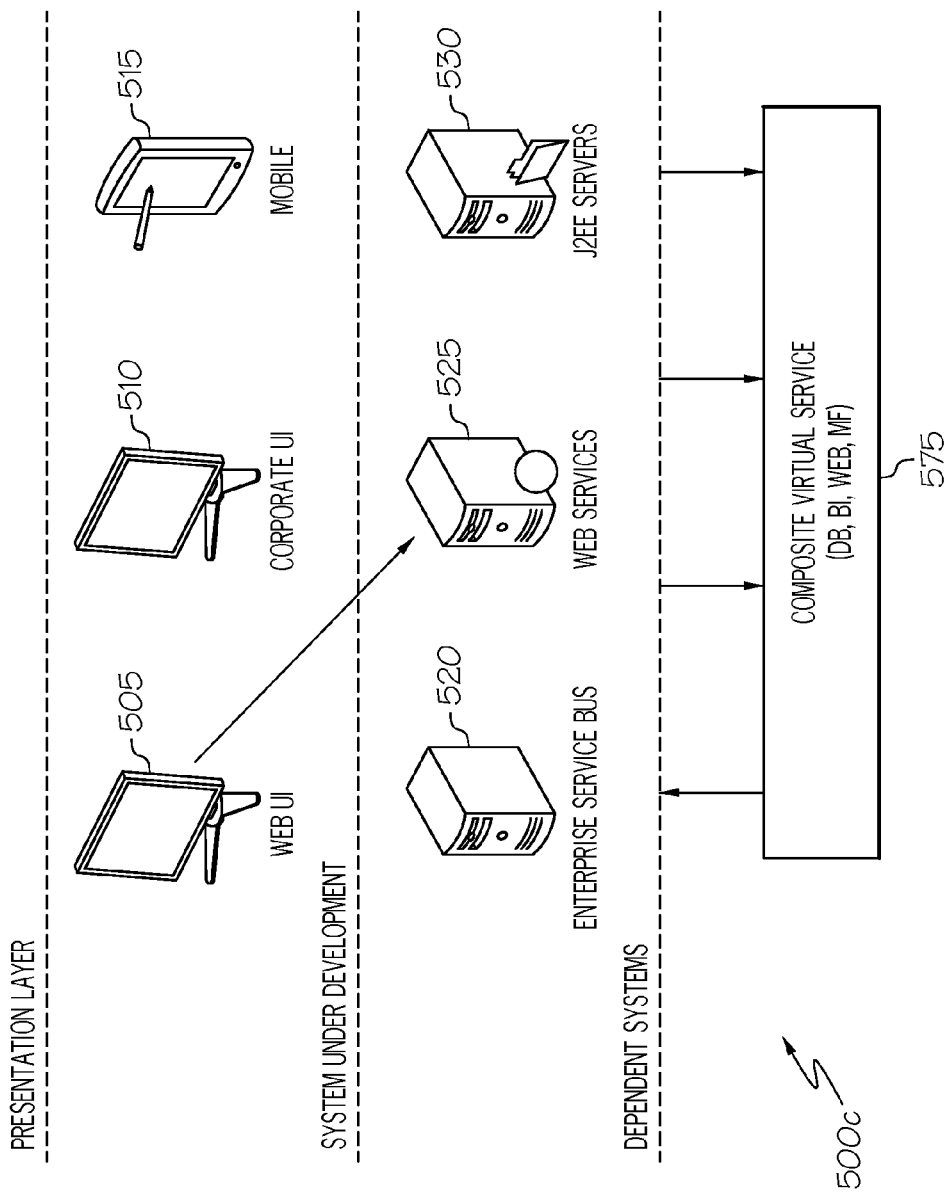

In the example of FIG. 5C, a composite virtual service 575 can be instantiated from a composite service model generated from the collective monitored requests and responses between the system under development and dependent systems, as well as determined correlations between the transactions involving the distinct components of the dependent systems (e.g., 535, 540, 545, 550). In this example, a single composite virtual service can be instantiated and stand-in for all of the dependent systems in a particular business transaction context. In other examples, only a portion of the dependent systems modeled by a composite service model may be unavailable. In such instances, the composite service model may be used to deploy a virtual service that only simulates the unavailable dependent systems, (i.e., and not the live dependent systems). In other examples, the instantiated virtual service may still be capable of simulating the available, or live, dependent systems, but the virtual service environment may cause requests to these available dependent systems to be pushed or routed, as usual, to the live dependent systems, with only requests of the unavailable systems being handled by the virtual service. Further, where a portion of the modeled dependent systems are live and available, in some instances, the live systems may, themselves, interface with the virtual service representing the remainder of the unavailable dependent systems in the business transaction context (e.g., when an interdependency exists between the dependent systems), among other examples.

Figure 6A:
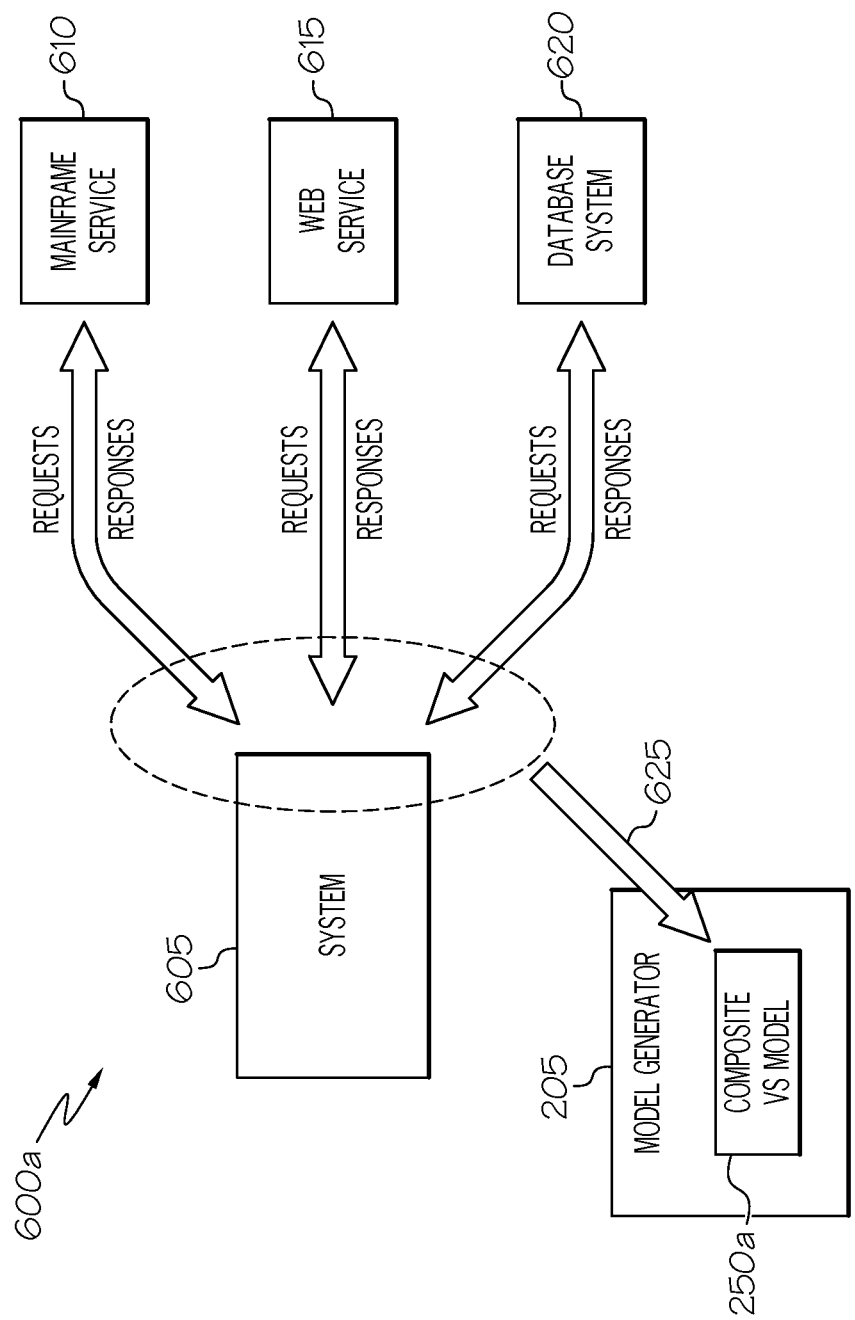
FIG. 6A-6B are simplified block diagrams illustrating example virtualization of multiple dependent systems in accordance with at least one embodiment.

Turning to FIG. 6A, a simplified block diagram 600a is shown illustrating example recording of transaction fragments between a particular system 605 and multiple other systems, such as a mainframe service 610, web service 615, and database management system 620 upon which the particular system 605 is dependent. In some cases, the particular system 605 may be a system under development or under test. Various recording components can be utilized to capture data describing various requests and responses between the particular system 605 and the dependent systems 610, 615, 620. Different techniques can be employed to capture requests and responses for transactions of each of the dependent systems 610, 615, 620 and can be based on the technology employed by the dependent system as well as the mechanism by which the particular system communicates with each respective dependent system. One or more recording components can be used to capture the requests and responses as experienced by the particular system. Each recording component, whether agent-based, network-based, or otherwise, can report its results 625 to a virtualization system for access by a model generator 205 that can generate a composite virtual service model 250a that models not only each respective service's 610, 615, 620 interaction with the particular system (or component) 605 but also the correlation between the respective services 610, 615, 620.

Figure 6B:
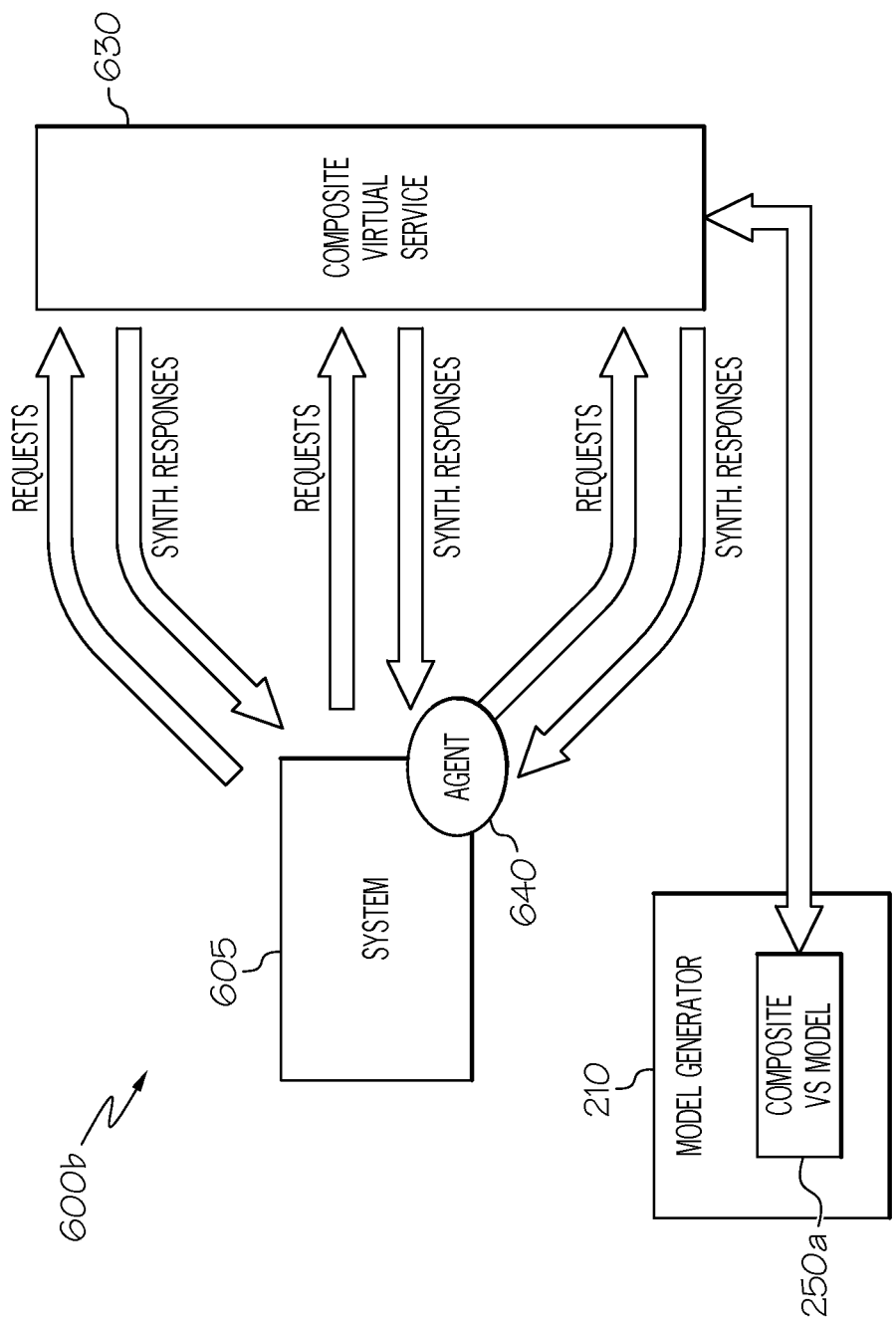

Turning to FIG. 6B, a simplified block diagram 600b is shown illustrating example playback of the composite virtual service model 250a to instantiate a composite virtual service 630 simulating the dependent services' 610, 615, 620 interactions with the system 605. The composite virtual service 630 can stand-in for services 610, 615, 620. Requests generated by the particular system 605 and sent to the respective dependent services 610, 615, 620 can be intercepted and passed to the composite virtual service 630. In some cases, one or more agents 640 can be instrumented on the particular system 605 and can be leveraged to instantiate the composite virtual service 630. For instance, the particular system 605 may interface with one of the dependent services through a driver, over an encrypted channel, or another mechanism that may make it desirable to capture requests and synthesize responses through the agent 640 rather than by capturing requests and synthesizing responses at the wire. Indeed, some of the transactions synthesized using composite virtual service 630 may utilize an agent 640, while other transactions are virtualized by directing the requests to a system hosting the composite virtual service and having the composite virtual service 630 send its synthesized responses back over the network to the particular system 605. Regardless, the composite virtual service 630 (through virtual service engine 210) can virtualize each of the multiple correlated dependent services or component consistent with the technology and transport mechanism utilized in real world transactions between the particular system 605 and the respective dependent systems such that the synthesized responses are accepted as "real" by the consuming system 605. For example, a composite virtual service synthesizing responses of a mainframe, a web service, and database may provide responses in EBCDIC and column delimited (copybook format) for the mainframe, XML for the web service, and in a result set/tuple for the database, among potentially many other examples. Further, when synthesizing the various transports involved in the transaction, the data can be formatted according to each respective transport. In some cases, the data can be normalized (e.g., in a common format) at the service model level, such that the data is translated (e.g., during recording) from the transport-specific format to the normalized form (e.g., for analysis by the model generator) and vice versa (e.g., during playback using the deployed virtual service) from the normalized form to the corresponding transport-specific format.

Turning to FIGS. 7A-7B, simplified flowcharts 700a-b are presented illustrating example techniques involved in generating and using composite virtual service models. For instance, in the example of FIG. 7A, data is identified 705 describing requests and responses in a first transaction involving a first software component. The data may describe a particular instance of the first transaction including a particular request and a corresponding response by the first component to the particular request. The data can describe multiple instances of the first transaction along with the corresponding observed requests and responses by the first component. Further, data can be identified 710 describing requests and responses in instances of a second transaction involving a different, second software component. Identifying 705, 710 transaction data can include capturing requests and responses between the components involved in the instances of the transactions, live, real world instances of the transactions. A correlation 715 can be determined between one or more values of data generated in each of the first and second transactions within a transaction context involving the first and second transactions, such as a business transaction context. A composite virtual service model can be defined 720 from the data identified in 705, 710, the composite virtual service modeling the first and second transactions within the transaction context as well as the identified correlation between the first and second transactions, in particular, the data values identified as correlating between respective instances of the first and second transactions.

A composite virtual service model can be utilized to instantiate a composite virtual service that generates synthetic responses of multiple components within transactions in a particular transaction context. The composite virtual service can model correlations between the data in the distinct transactions and can further model each of the multiple components' involvement within the transaction context, together with the respective different technologies and transports used by the different components in their respective transactions. For instance, as shown in the example of FIG. 7B, a request can be identified 730, or intercepted, within a particular instance of a first transaction. A composite virtual service model can be identified 735 (such as a composite service model generated according to the techniques illustrated in the example of FIG. 7A) that corresponds to the first transaction and at least one other, second transaction within a transaction context. The composite virtual service model can be used to generate 740 a first synthetic response of the first component within an instance of the first transaction based on attributes of the identified request. The composite virtual service model can be used to generate 745 a second synthetic response of the second component within an instance of the second transaction within the transaction context. Generating 745 the second synthetic response can take into account a correlation between data in the second transaction with data in the first transaction, as defined in the composite virtual service model, among other features of the transaction context. For instance, the composite virtual service model can allow virtualization of the two different components, including virtualization consistent with their respective (potentially different) technologies and transports, all from a single composite virtual service model.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   identifying a request of a first software component by a particular component in a first transaction;
   identifying a composite virtual service model hosted on a computing system, wherein the composite virtual service model corresponds to instances of a particular composite transaction, the composite virtual service model models response behavior of a plurality of different software components identified as involved in real world instances of the particular composite transaction, the particular composite transaction comprises a plurality of sub-transactions comprising the first transaction involving the first component and a second transaction comprising a request to and a response from a different, second component, and
the composite virtual service model defines a correlation between the first transaction and the second transaction;
generating, from the composite virtual service model, a first synthetic response based at least in part on the request, wherein the first synthetic response simulates a response of the first component in the first transaction; and
generating, from the composite virtual service model, a second synthetic response based at least in part on the correlation, wherein the second synthetic response simulates a response of the second component in the second transaction.

2. The method of claim 1, wherein the second synthetic response is further based at least in part on the request.

3. The method of claim 1, wherein the correlation comprises a correlation between values of first data in the first transaction with values of second data in the second transaction, and generating the second synthetic response comprises identifying a particular value of the first data and applying the particular value to the second data.

4. The method of claim 3, wherein the first synthetic response comprises the first data.

5. The method of claim 3, wherein the second synthetic response comprises the second data.

6. The method of claim 3, wherein the first data is labeled differently than the second data.

7. The method of claim 3, wherein the particular value of the first data is determined from attributes of the request.

8. The method of claim 1, wherein the first and second transactions are within a common transaction context and the composite virtual service model is to model a transaction within the transaction context.

9. The method of claim 8, wherein the correlation corresponds to a key value within the common transaction context.

10. The method of claim 1, wherein the composite virtual service model is based at least in part on monitored requests and responses in instances of the first and second transactions.

11. The method of claim 1, wherein the first component uses a first technology to generate responses and the second component uses a different, second technology to generate responses.

12. The method of claim 11, wherein the first synthetic response is generated according to the first technology and the second synthetic response is generated according to the second technology.

13. The method of claim 1, wherein the first component uses a first transport to send responses and the second component uses a different, second transport to send responses.

14. The method of claim 13, wherein the first synthetic response is provided according to the first transport and the second synthetic response is provided according to the second transport.

15. The method of claim 1, wherein the correlation is determined based on identifying that the first and second data share a common value.

16. The method of claim 1, wherein the request comprises a first request, and the method further comprises:

determining that a first subset of the plurality of software components is available to handle requests in a first portion of the plurality of sub-transactions corresponding to the first request;
determining that a second subset of the plurality of software components are to be virtualized in a second portion of the plurality of sub-transactions corresponding to the first request, wherein the second subset of the plurality of software components comprises the first and second software components;
forwarding the requests in the first portion of the plurality of sub-transactions to the first subset of the plurality of software components; and
using the composite virtual service model to generate synthetic responses to the requests in the second portion of the plurality of sub-transactions.

17. A computer program product comprising a non-transitory computer readable storage medium comprising computer readable program code embodied therewith, the computer readable program code comprising:
computer readable program code configured to identify a request of a first software component by a particular component in a first transaction;
computer readable program code configured to identify a composite virtual service model hosted on a computing system, wherein the composite virtual service model corresponds to instances of a particular composite transaction, the composite virtual service model models response behavior of a plurality of different software components identified as involved in real world instances of the particular composite transaction the particular composite transaction comprises a plurality of sub-transactions comprising the first transaction involving the first component and a second transaction comprising a request to and a response from a different, second component, and the composite virtual service model defines a correlation between the first transaction and the second transaction;
computer readable program code configured to generate, from the composite virtual service model, a first synthetic response in the first transaction by the first component based at least in part on the request; and
computer readable program code configured to generate, from the composite virtual service model, a second synthetic response in the second transaction by the second service based at least in part on the correlation.

18. A system comprising:
a processor device;
a memory element;
a virtual service engine to:
identify a request of a first software component by a particular component in a first transaction;
identify a composite virtual service model hosted on a computing system, wherein the composite virtual service model corresponds to instances of a particular composite transaction, the composite virtual service model models response behavior of a plurality of different software components identified as involved in real world instances of the particular composite transaction, wherein the composite virtual service model corresponds to instances of a particular composite transaction, the composite virtual service model models response behavior of a plurality of different software components identified as involved in real world instances of the particular composite transaction, the particular composite transaction comprises a plurality of sub-transactions comprising the first transaction involving the first component and a second transaction comprising a request to and a response from a different, second component, and the composite virtual service model defines a correlation between the first transaction and the second transaction;

generate, from the composite virtual service model, a first synthetic response by the first component in the first transaction based at least in part on the request; and generate, from the composite virtual service model, a second synthetic response by the second service in the second transaction based at least in part on the correlation.

19. The system of claim 18, further comprising a virtual service model generator to:

identify first data describing requests and responses in instances of the first transaction;

identify second data describing requests and responses in instances of the second transaction;

determine that the first and second transactions are correlated within a particular transaction context; and generate the composite virtual service model based at least in part on the first and second data.

20. The system of claim 19, wherein the first virtual service model generator is further to:

generate a separate, first virtual service model to model the first transaction based at least in part on the first data; and generate a separate, second virtual service model to model the second transaction based at least in part on the second data.

* * * * *